INVENTORS:
JAMES A. CAYWOOD
WILLIAM J. HOWARD
ATTORNEYS.

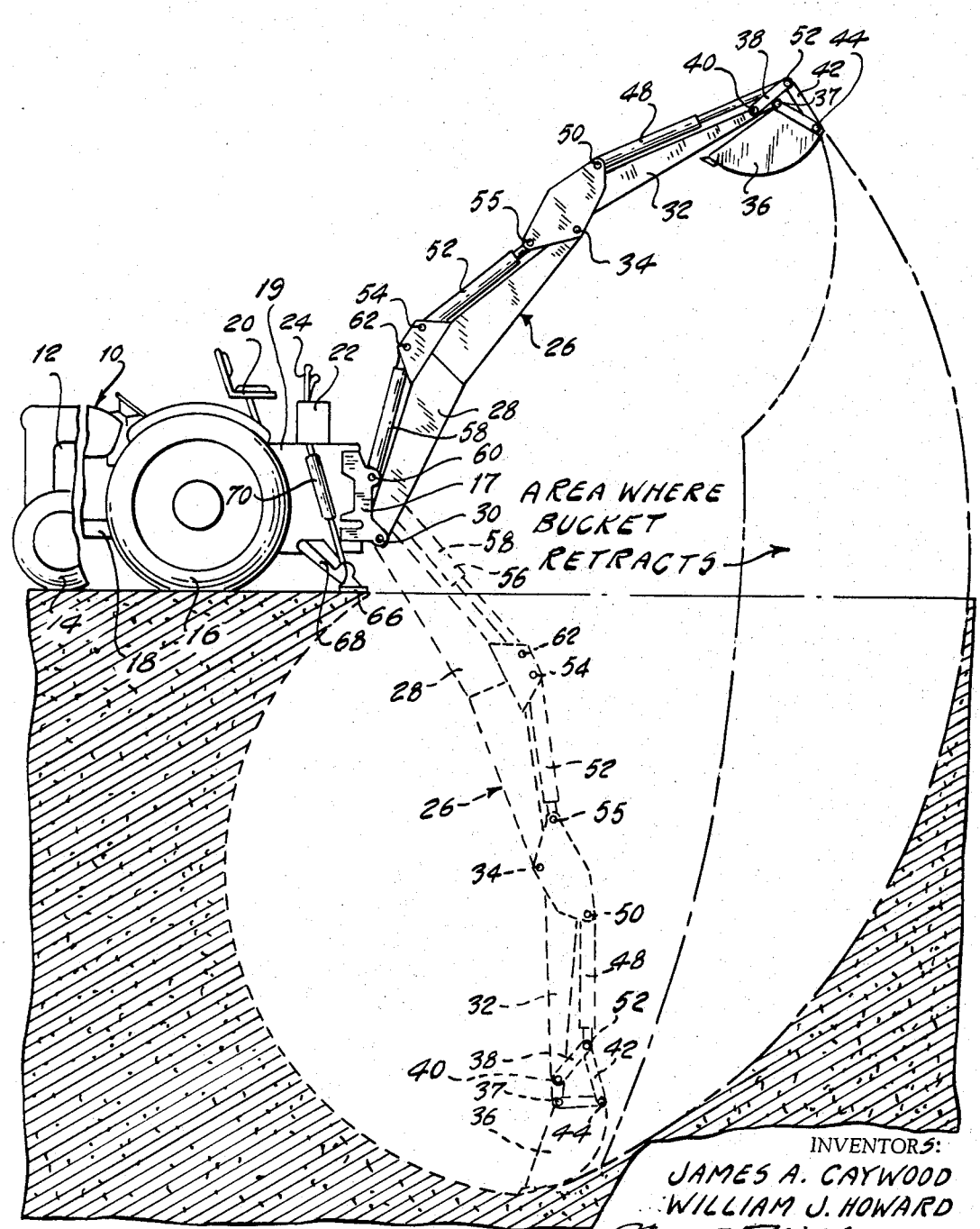

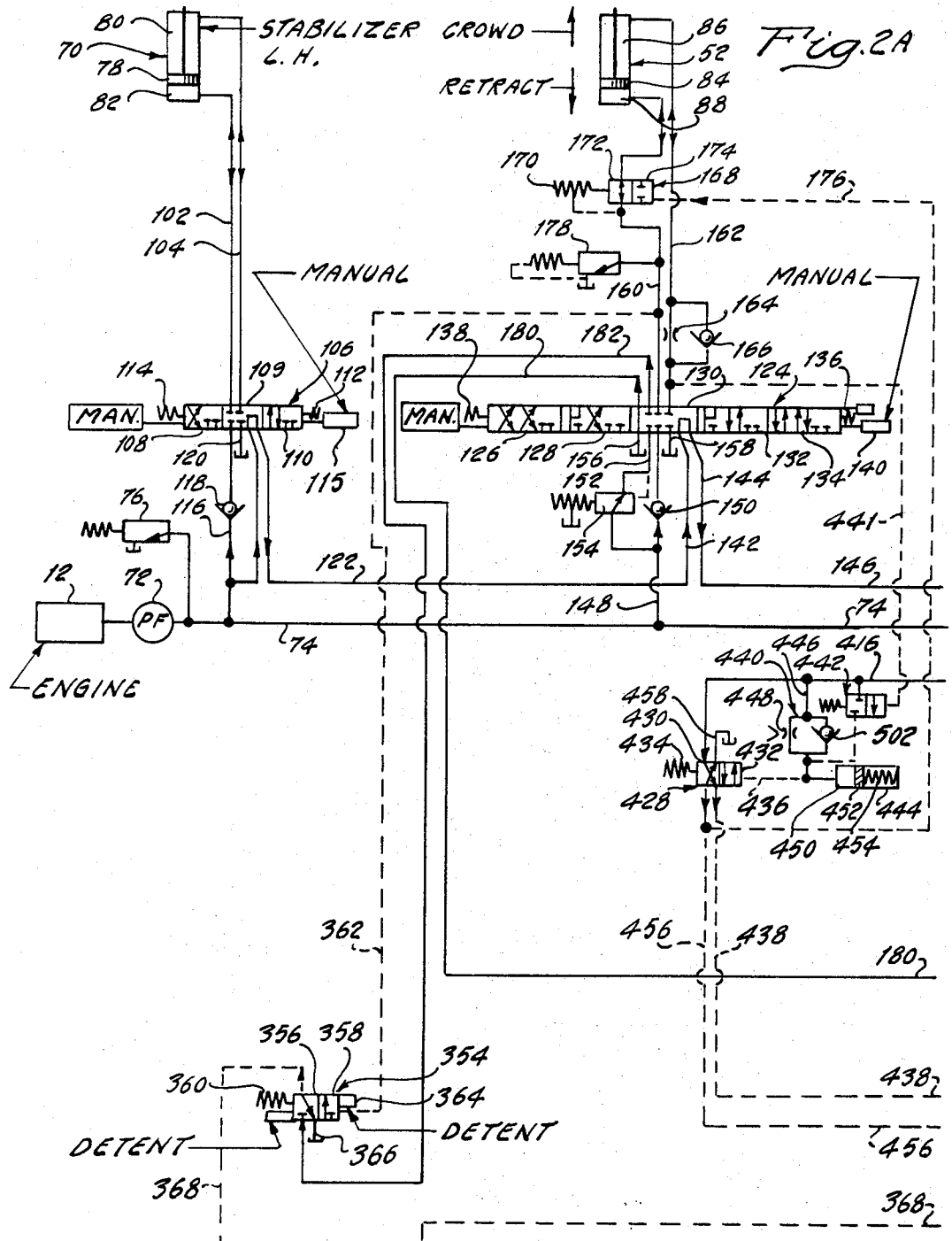

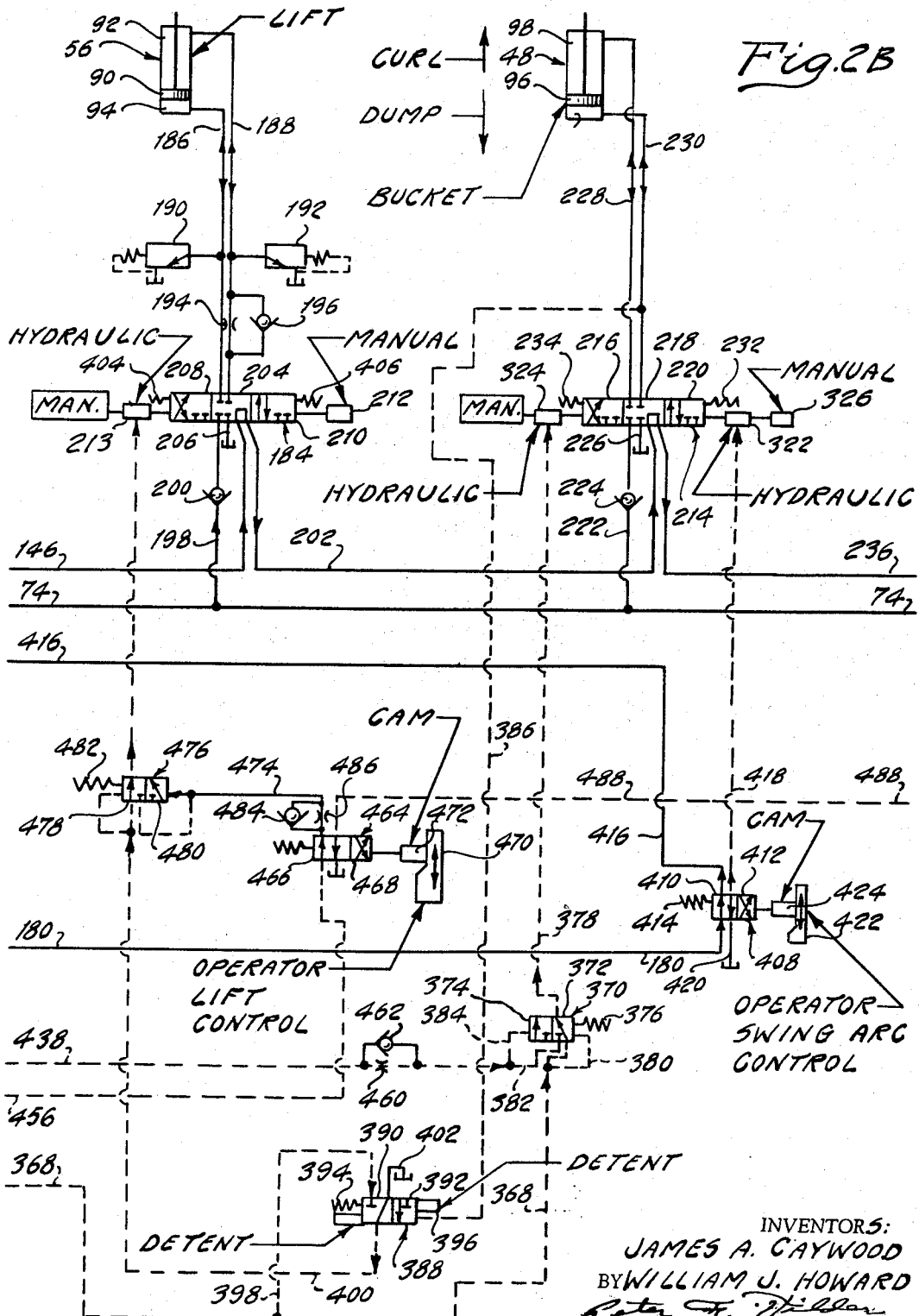

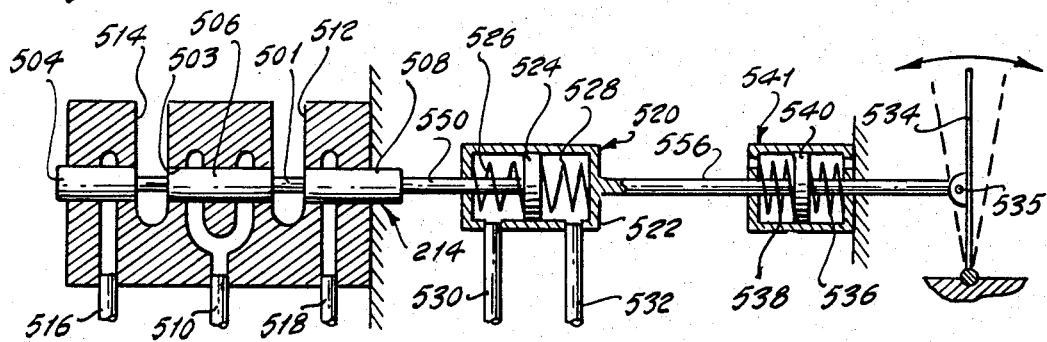
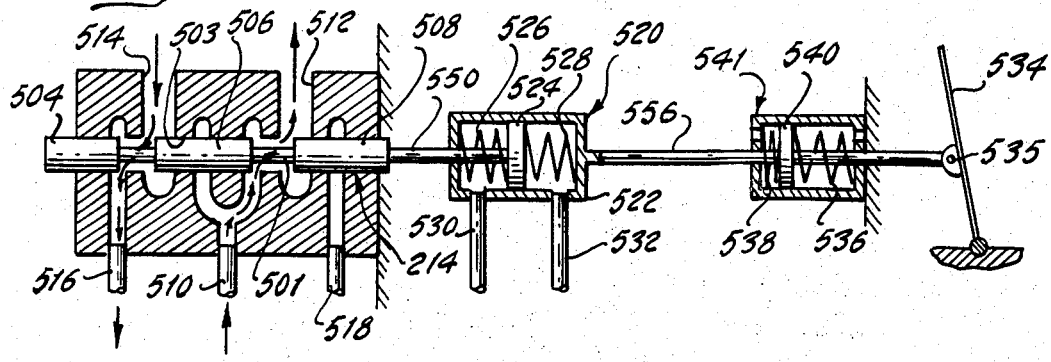
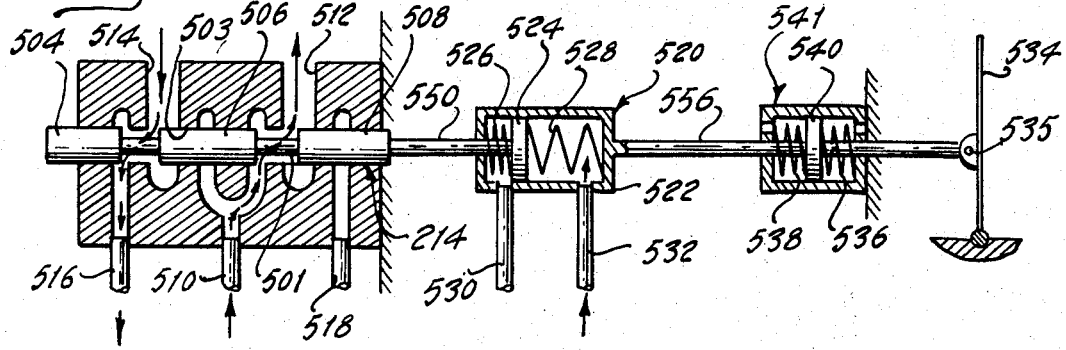
INVENTORS:
JAMES A. CAYWOOD
WILLIAM J. HOWARD
ATTORNEYS.

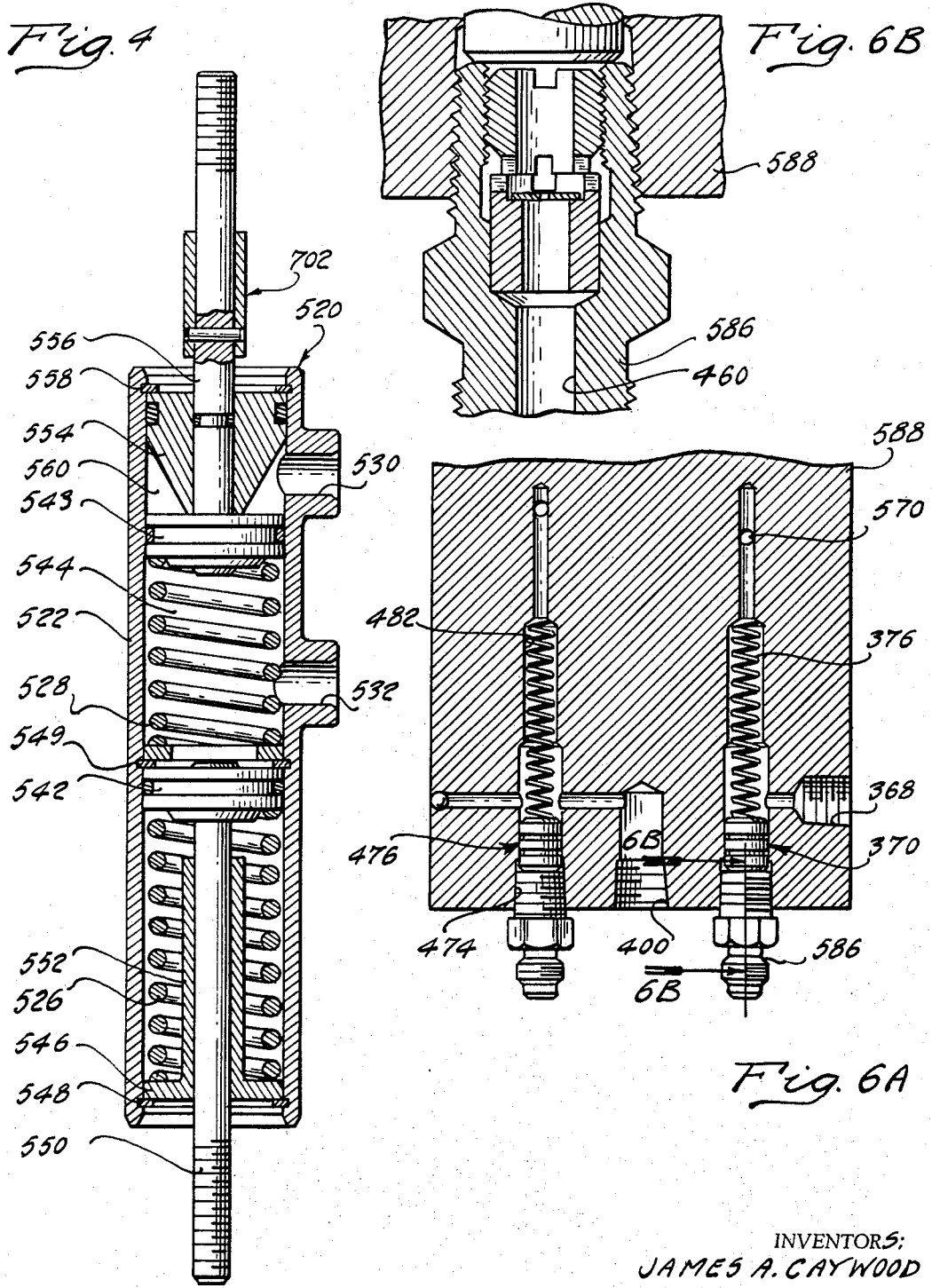

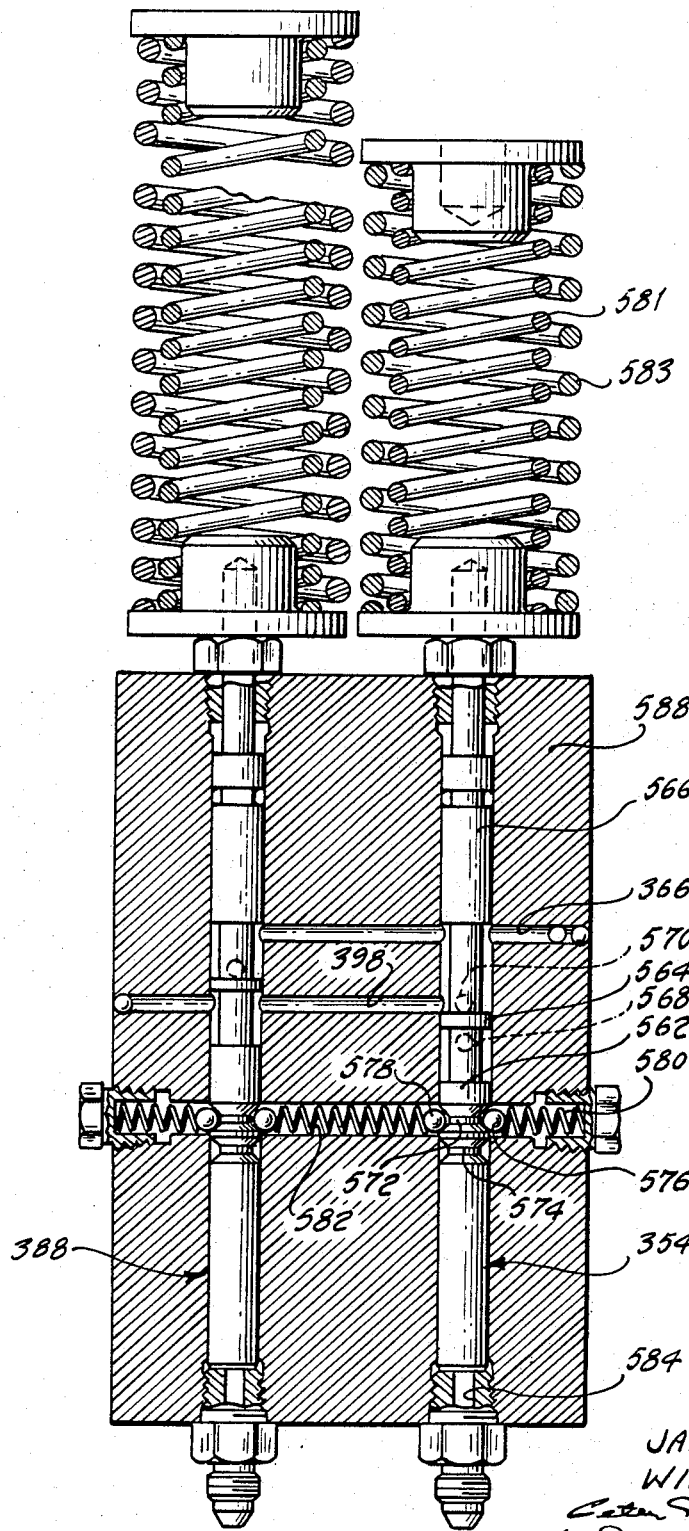

INVENTORS:
JAMES A. CAYWOOD
WILLIAM J. HOWARD
ATTORNEYS.

# 3,414,146
AUTOMATIC BACKHOE UNIT FOR USE WITH INDUSTRIAL TRUCKS AND TRACTORS

James A. Caywood, Birmingham, and William J. Howard, Warren, Mich., assignors to Ford Motor Company, Dearborn, Mich., a corporation of Delaware
Filed Aug. 11, 1966, Ser. No. 571,813
28 Claims. (Cl. 214—138)

ABSTRACT OF THE DISCLOSURE

This specification describes a hydraulic motor circuit for operating the articulated members of a backhoe digger. The circuit includes a pressure source for the motors and a pressure signal source for automatic pilot operators for a pressure distributor valve situated in the circuit. The operators respond to both pressure changes in the fluid motors and to the displacement of the motor driven elements to establish both an automatic digging sequence and an automatic retract sequence.

---

Our invention relates generally to implements adapted for mounting on agricultural and industrial tractors. It relates more particularly to articulated, powered digging mechanisms for use with tractors and to an automatic control system for controlling the motion of articulated elements of the mechanism. Such mechanisms commonly are identified in the art as backhoe units. They are used primarily for digging excavations and for trenching.

Backhoe units presently in commercial use include articulated portions or arms that are pivoted together for relative movement. A first base arm is pivoted on the chassis structure of an industrial tractor or the like for movement in a vertical plane about a horizontal axis. A first fluid motor in the form of a piston and cylinder mechanism is used for moving the first arm in the vertical plane with respect to the relatively stationary vehicle chassis. A second fluid motor in the form of a crowd cylinder and piston mechanism effects angular movement of a second arm with respect to the first arm in the same plane of movement of the first arm with respect to the chassis. The second arm usually is identified as the dipstick portion of the digging mechanism.

Situated at the outermost end of the second arm or dipstick portion of the structure is a bucket that is adapted to be mounted for oscillation about a horizontal axis. A third fluid motor in the form of a fluid cylinder and piston mechanism, known as the curl motor, is carried by the dipstick portion for effecting motion of the bucket with respect to the second arm.

Backhoe units of known construction include also a pair of swing cylinder and piston mechanisms situated on each transverse side of the backhoe structure for effecting swinging movement of the entire backhoe mechanism about a vertical axis. In this way the attitude of the vertical plane of movement of the backhoe arm portion with respect to the center line of the vehicle can be altered. One swing cylinder and piston mechanism is energized for effecting swinging motion of the backhoe unit in one direction and the opposite swing cylinder and piston mechanism is energized to effect return motion of the backhoe unit.

By appropriately controlling operation of the three fluid motors for the articulated elements of the backhoe unit and the two swing cylinder and piston mechanisms, the vehicle operator can carry out excavation and trenching operations with any desired digging pattern. In doing this, however, it heretofore has been necessary for the operator to control manually the distribution of working pressure to each of the five fluid motors in the desired operating sequence and to control manually also the exhaust of fluid pressure from the various fluid motors at the desired instant during the digging and retraction portions of the operating cycle. This is done by means of manually operated control valves that are arranged in an operator's console on the vehicle chassis. The control valves are situated in and partly define conduit structure interconnecting an engine powered fluid pump and the several fluid motors. The manipulation of the control valves requires a considerable amount of training and skill on the part of the operator.

According to a principal feature of our invention, we have provided an improved control valve system for controlling automatically the operation of the several fluid motors in a backhoe unit of the type above described in order to establish a predetermined operating sequence for any given job requirement. After the operator establishes the desired pattern, he can initiate a digging cycle and a retraction cycle of the bucket simply by operating a single control lever. The automatic control system responds to this lever movement by the operator by establishing sequential responses of the fluid motors. Provision is made also in the automatic control valve system for tailoring the responses to accommodate changes in the load that may be encountered during any given digging cycle. It automatically compensates for these changing operating conditions, however, while maintaining a minimum amount of operating time for each digging cycle and each retraction cycle. Not only does the device of the present invention reduce operator fatigue, but under certain circumstances it also may reduce the total time required to carry out any given excavation project when compared to the operating time required to perform the same work with a backhoe unit having conventional manually operated fluid motor controlling valves.

The provision of a backhoe unit of the type above described being a principal object of our invention, it is a further object of our invention to provide a control valve system for an articulated backhoe unit having semi-automatic valve functions which establish a predetermined operating pattern for articulated elements of the unit and which is characterized also by a manual override feature that will permit the vehicle operator to overrule the automatic function of any one of the valves during the operating cycle.

It is a further object of our invention to provide a valve system having flow distributor valve elements with both manual and hydraulic pilot responsive valve operators without the necessity for increasing the number of flow controlling valve elements when compared to a system that lacks the manual override feature described in the foregoing paragraph.

It is a further object of our invention to provide a control valve system of the type above described wherein the portions of the valve structure that produce the manual override feature are connected mechanically to operator controlled levers situated in a driver console on the vehicle chassis and wherein the semi-automatic valve functions may be carried out in response to the triggering of the hydraulic pilot operators without causing any control sensation or displacement of the operator-controlled valve linkage elements.

It is a further object of our invention to provide a semi-automatic control valve system of the type above-described including a dynamically stable, pilot-operated valve which responds to a pressure change in the working chamber for one fluid motor to establish and disestablish communication between high pressure regions of the control circuit and a second fluid motor working chamber. We contemplate that the dynamic stability, which is a characteristic of our improved pilot valve mechanism not found in conventional flow distributor valve mechanisms, will produce more precise fluid pressure distribution in the system, thereby improving the over-all reliability in the various automated functions of the system.

It is a further object of our invention to provide a control system for an automatic backhoe of the type above set forth wherein the system includes a timing device for controlling the magnitude of the arc of travel of the dipstick during the retraction cycle. The timed valve action of the timing device is triggered by movement by the operator of the single control lever that initiates the operation of the retraction cycle.

It is a further object of our invention to provide a control valve system that establishes a semi-automatic retraction cycle in a backhoe mechanism of the type above-described wherein the retraction cycle includes as the final operation a dumping sequence of the bucket.

It is another object of our invention to provide a control system for an automatic backhoe of the type above-described wherein the retraction cycle establishes a simultaneous movement of at least two of the motors, e.g., the swing fluid motors and a so-called "crowd" fluid motor, to produce a sloping bucket traversing path. Further, by providing simultaneous movement of the dipstick portion of the system and the bucket itself during the retraction cycle, the total distance through which the load must be moved is reduced, thereby reducing the total operating time for the digging and retraction cycles.

Further objects and features of our invention will become apparent from the following description and from the accompanying drawings, wherein:

FIGURE 1 shows in schematic form an elevation view of an industrial tractor with a backhoe unit mounted on the rear portion of its chassis;

FIGURES 2A, 2B and 2C show in schematic form a control valve system with which the improvements of our invention may be used;

FIGURES 3A, 3B and 3C show a hydraulic-mechanical valve mechanism for use in the system of FIGURES 2A, 2B and 2C;

FIGURE 4 is a longitudinal cross-sectional view showing a portion of the valve structure of FIGURES 3A, 3B and 3C;

FIGURE 5 is a longitudinal cross-sectional view along section line 5—5 of FIGURE 7B showing a pilot-operated detent valve in tandem arrangement for use in the control valve system of FIGURES 2A, 2B and 2C;

FIGURES 6A and 6B show in cross-sectional form a valve assembly embodying the features of two pressure operated flow control valves illustrated in FIGURES 2A, 2B and 2C. FIGURE 6B is taken along the plane of section line 6—6 of FIGURE 6A;

Figure 2C:
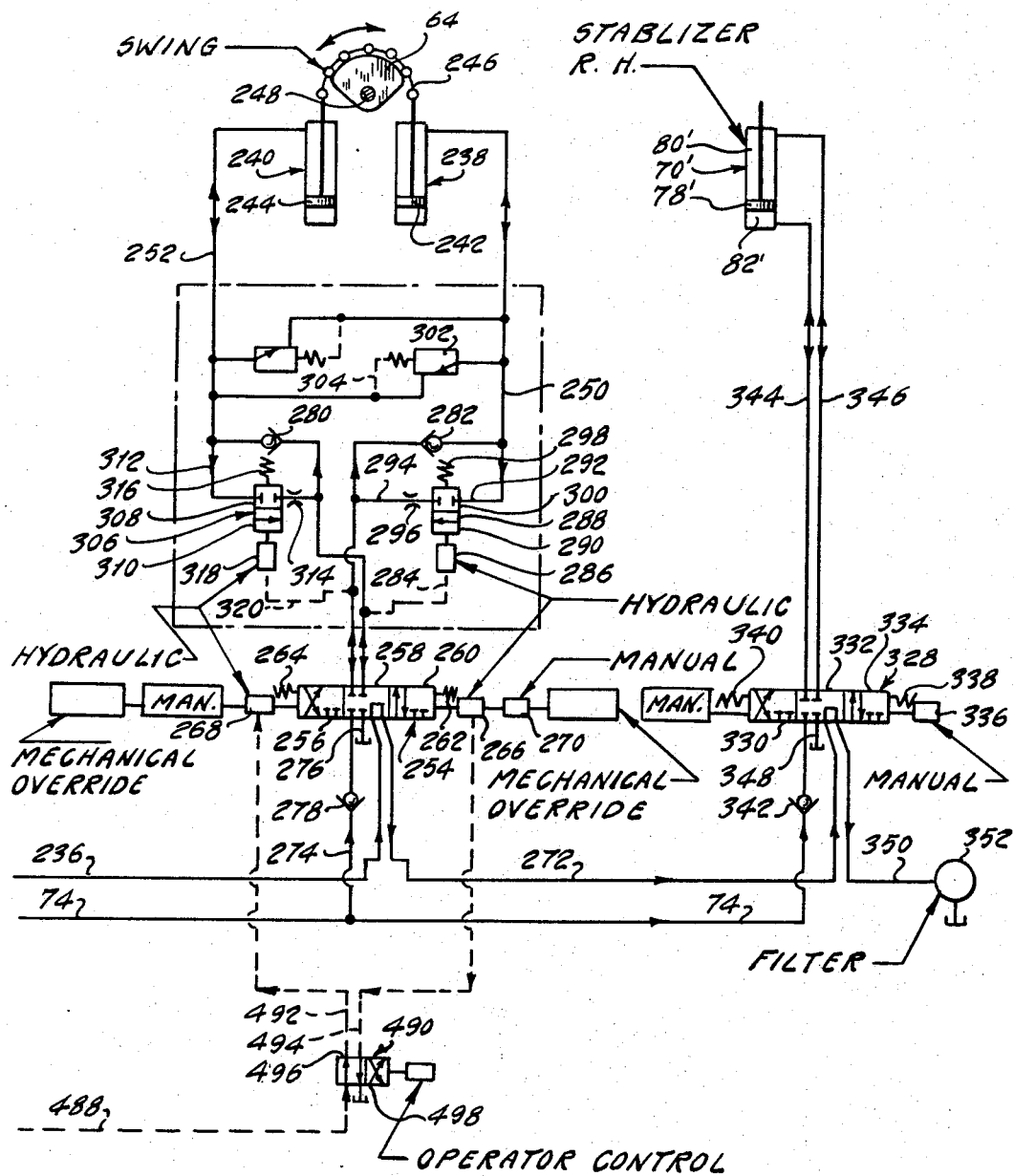
Figure 7A:
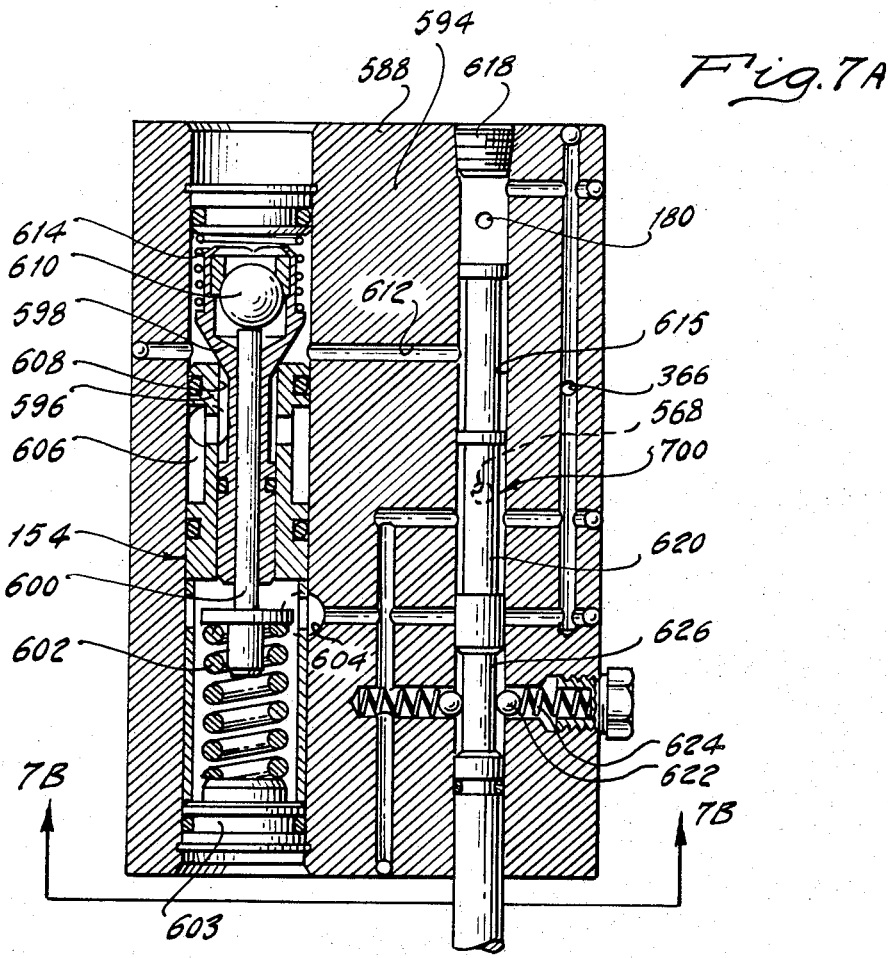

FIGURE 7A shows in longitudinal cross-sectional form a regulator valve for controlling the circuit pressure in the automatic control system illustrated in FIGURES 2A, 2B and 2C. It shows also portions of the main automatic control valve which is under the control of the vehicle operator to pressurize and exhaust the crowd motor. FIGURE 7A is taken along section line 7A—7A of FIGURE 7B.

Figure 7B:
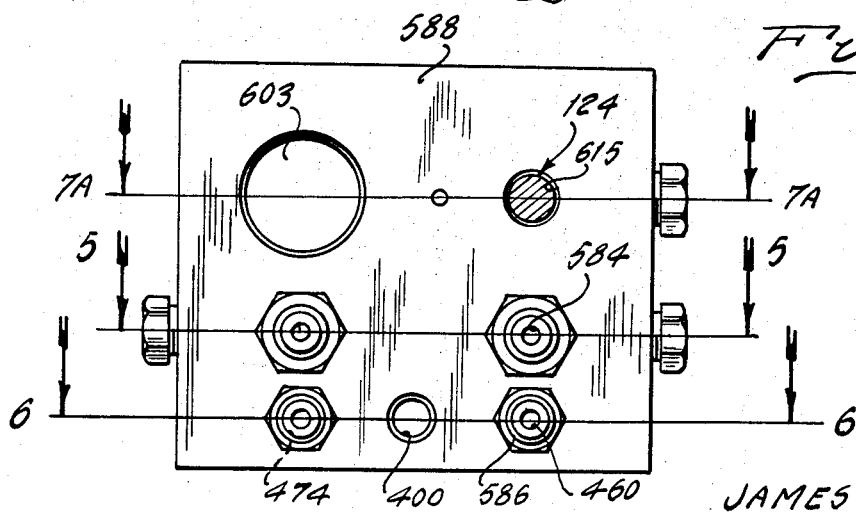

FIGURE 7B is an end view of the main valve body.

In FIGURE 1, numeral 10 designates generally a tractor. It includes an engine 12, dirigible wheels 14, traction wheels 16 and a chassis 18. Mounted on the rear of the chassis 18 is a backhoe main frame 19 provided with a seat 20 on the main frame 19 for the backhoe operator. Located adjacent the seat 20 is a valve console 22 having control lever elements 24.

Mounted on the rear of the main frame 19 is a backhoe unit identified generally by reference character 26. It includes a swing frame 27 which is pivotally mounted on the main frame for swinging on a vertical axis through an angle of about 180°. A first articulated arm or boom 28 is pivoted at 30 on the swing frame 27 for oscillation about a horizontal axis. A second arm or dipstick of the backhoe is indicated at 32. This arm is pivoted at 34 for oscillation on the outer end portion of the boom 28.

A bucket 36 is mounted pivotally for rotation about a horizontal axis 37 on the remote end of the dipstick 32. The bucket operating mechanism includes a four bar linkage comprising link 38 which is joined at its innermost end 40 to the dipstick 32 near its outer end and a second link 42 interconnecting the outermost end of the link 38 and the back edge 44 of the bucket 36.

A fluid motor in the form of a double acting cylinder 48 is carried by the dipstick 32 and one of the operating ends is pivoted at 50 thereto. The other operating end of the fluid motor 48 is pivoted at 52 to the link 38 and companion link 42. Thus as the operating ends of the motor 48 are extended with respect to each other, the bucket 36 will be tilted in a clockwise fashion (closed) with respect to the dipstick 32 as viewed in FIGURE 1. It is opened as the fluid motor 48 draws its operating ends together. The motor 48 will be identified hereafter as the "bucket curl" motor.

The so-called "crowd" motor is identified in FIGURE 1 by reference character 52. It may be in the form of a double acting cylinder and piston mechanism in which the cylinder is pivoted at 54 on the articulated arm 28 for oscillation about a horizontal axis. The ram portion of the motor 52 is pivoted at 55 to the dipstick portion 32, thereby allowing oscillation of the motor 52 with respect to the portion 32.

A so-called hydraulic lift motor consists of a double acting cylinder 58 which is pivoted at 60 to the swing frame 27. The ram portion of the lift motor 56 is pivoted at 62 to an intermediate section of the articulated arm or boom 28.

By operation of cylinder 58, the boom 28 and dipstick 32 can be lifted or lowered from the extreme position shown in FIGURE 1 by full lines to the lowest extreme position shown in FIGURE 1 by dotted lines. This motion takes place in a vertical plane.

The dipstick 32 can be oscillated with respect to the boom 28 by operation of the fluid motor 52. During the initial stage of the digging cycle, the bucket 36 is tilted in a clockwise direction (closed) by extending the curl cylinder 48. The bucket 36 can be dumped following the completion of the retraction cycle by retracting the curl motor 48 (opening the bucket).

The boom is swung by oscillation of the swing frame 27 about its vertical pivot 248. The angular position of the swing frame 27 with respect to its vertical axis is controlled by a pair of cylinders 238 and 240 situated on opposed sides of the vertical pivot.

A stabilizer pad 66 is situated on each lateral side of chassis 18. It is carried by a stabilizer arm 68 pivoted to the main frame 19. The arm 68 can be raised and lowered with respect to the terrain by means of a double acting stabilizer cylinder or motor 70. A similar stabilizer assembly is mounted on the opposite side of the vehicle 10. The stabilizers serve to prevent lateral overturning of the tractor and backhoe.

In FIGURES 2A, 2B and 2C, numeral 72 designates in schematic form a pump that is driven by the vehicle engine 12. Its output side is connected to a line pressure passage 74. A pressure relief valve indicated schematically at 76 communicates with passage 74 and limits pressure therein to a maximum which may be about 2200 p.s.i.

The stabilizer motor 70, the crowd motor 52, the lift motor 56 and the bucket curl motor 48 each comprise a cylinder and a relatively movable piston which cooperate to define a pair of opposed working chambers. The piston for the stabilizer motor 70 is indicated at 78 and the two working chambers for the stabilizer motor are indicated at 80 and 82. The piston for the crowd motor 52 is shown at 84. It cooperates with the associated cylinder to define a pair of opposed working chambers 86 and 88.

The lift motor includes a piston 90 which cooperates with its associated cylinder to define a pair of opposing working chambers 92 and 94. The bucket curl motor 48 has a piston 96 which cooperates with its associated cylinder to define a pair of opposed working chambers 98 and 100.

As indicated in the foregoing description, there is a stabilizer motor 70 at each side of the vehicle. In the schematic drawings of FIGURES 2A, 2B and 2C, the right-hand stabilizer motor and the left-hand stabilizer motor have been identified by similar reference characters since they are identical in function. To avoid confusion, however, the reference numerals for the right-hand stabilizer motor have been assigned prime notations.

Distribution of pressurized fluid from the line pressure passage 74 to the stabilizer motor 70 takes place through a pair of pressure-delivering passages 102 and 104 extending, respectively, to the working chambers 82 and 80. In the passages 102 and 104 is a three-position, manually operated valve 106. This valve includes a movable valve element having three operating positions identified, respectively, by reference characters 108, 109 and 110. The valve is spring biased to the neutral position, illustrated in FIGURE 2A by centering springs 112 and 114. A manually controlled valve operator is represented by character 115.

When the valve 106 assumes the position shown in FIGURE 2A, pressure distribution through the passages 102 and 104 is blocked. The high pressure passage 74 communicates with the valve 106 through passage 116. A one-way check valve 118 prevents backflow of pressure from the valve 106 to the passage 74, although it permits unrestricted communication in the other direction.

The fluid reservoir or tank communicates with the valve 106 through drain passage 120. Fluid communication between passage 120 and passages 102 and 104 is interrupted when the valve 106 assumes the neutral position shown in FIGURE 2A.

If the operator shifts the valve 106 to position 108, passage 116 is brought into fluid communication with passage 104 and passage 102 is brought into fluid communication with passage 120. This causes the piston 78 of the left-hand stabilizer to move inwardly, thereby withdrawing the associated stabilizer ground engaging pad. If the valve 106 is shifted to position 110, free communication is established between passage 116 and passage 102 while communication between passage 104 and the drain passage 120 is established. This causes the piston 78 to move outwardly, thereby causing the stabilizer pad to engage the ground to stabilize the vehicle.

When the valve 106 assumes the position shown, communication is established through valve 106 between passage 116 and a pressure supply passage 122. If the valve 106 assumes either of the stabilizer stroking positions 108 or 110, communication between passage 116 and passage 122 is interrupted.

The backhoe structure described in the above detailed description is a more or less conventional backhoe structure, to which the control circuit of the present invention has been applied.

A main manually operated control valve is shown at 124. It includes a movable valve element having five operating positions. These are identified, respectively, by reference numerals 126, 128, 130, 132 and 134. The movable valve element of valve 124 is spring biased to a neutral position by opposed centering springs 136 and 138. A manual valve operator is schematically shown at 140. When the valve 124 assumes the neutral position 130, which is shown in FIGURE 2A, passage 142 is brought into direct communication with passage 144. Passage 142 in turn communicates with passage 122 and passage 144 communicates with passage 146.

Line pressure from passage 74 is distributed to the valve 124 through passage 148. A one-way flow check valve 150 is situated in the passage 148. The branch passage 152 extends from passage 148 at a location on the upstream side of the valve 150 to valve 124. Situated in and partly defining this passage 152 is a regulator valve 154, which is calibrated to maintain a predetermined pressure level in passage 152, for example, 300 p.s.i., when the valve 124 assumes the neutral position shown, passage 152 is blocked.

A pair of drain passages 156 and 158 extend from the valve 124 to the sump region or tank.

Valve 124 controls pressure distribution to passages 160 and 162 which extend to opposed fluid pressure working chambers 88 and 86, respectively, for the crowd motor 52. Located in passage 162 is a flow-controlling orifice 164 which restricts the rate of fluid transfer from one working chamber 86. A one-way fluid check valve 166 is arranged in parallel disposition with respect to the restriction 164, however, to provide uninhibited transfer of pressurized fluid through passage 162 to the working chamber 86.

In passage 160 is a two-position valve 168 which normally is biased by a spring 170 to a first valve position 172. When it is in this position, free pressure distribution through passage 160 can take place. Valve 168 can be shifted to a second position 174 by pressurizing a signal passage 176. When passage 176 is exhausted, the valve 168 assumes the position shown. If it assumes the position 174, however, pressure distribution through passage 160 is blocked.

A pressure limiting valve 178 communicates with passage 160 to limit the magnitude of the pressure in that passage. In a preferred form of our invention, the valve 178 can be calibrated to establish a limiting pressure of 4,000 p.s.i. The operator may manipulate the valve 124 to suitably position the crowd motor as he manuevers the vehicle into digging position. For example, as the operator shifts the valve 124 to position number 132, pressure is distributed to chamber 88 of the crowd motor while chamber 86 is exhausted. Passages 142 and 144 are blocked. Passages 180 and 182 communicate through valve 124 and extend to semi-automatic pressure responsive parts of the valve system, as will be explained subsequently. The valve blocks communication with passage 152. On the other hand, the pressure distribution to the pressure chambers 86 and 88 can be reversed if the operator shifts valve 124 to position number 128. Passages 180 and 182 continue to be exhausted through vent passage 156 and passages 142 and 144 continue to be blocked.

Pressure distribution to the lift motor 56 is controlled by valve 184 which is situated in passages 186 and 188 extending, respectively, to pressure chambers 94 and 92 (see FIGURE 2B). A pressure relief valve 190 communicates with passage 186 to limit the pressure in passage 186 to a predetermined value such as 3,500 p.s.i. A corresponding pressure limiting valve 192 is in fluid communication with passage 188. Transfer of fluid from working chamber 92 through passage 188 is restricted by a flow restriction 194. Distribution of pressurized fluid to the chamber 92 through passage 188 is uninhibited, however, due to the presence of a one-way flow check valve 196 in parallel disposition with respect to the restriction 194.

Valve 184 communicates with line pressure passage 74 through branch passage 198. Reverse flow of fluid from the lift motor 56 through passage 198 is prevented by a one-way flow check valve 200. Passage 146 communicates with passage 202 through valve 184 when the latter assumes position number 204 which is illustrated in FIGURE 2B. When it assumes this position, passage 198 is blocked as are passages 184 and 188. A drain passage 206 connects the valve 184 to the tank or sump region.

When the valve 184 assumes the position number 208, passage 198 is brought into fluid communication with passage 188, thereby pressurizing working chamber 92 to cause the lift motor 56 to lift the backhoe unit. At this time passage 186 is exhausted through vent passage 206. If the valve 184 is shifted to position number 210, communication between passages 146 and 202 again is interrupted and communication is established between pressurized passage 198 and passage 186 extending towards chamber 94. Passage 188 and working chamber 92 are exhausted. This causes the lift motor to lower the backhoe unit.

Valve 184 can be operated manually by means of a driver-controlled mechanical operator 212. It can be operated hydraulically also by means of a hydraulic pilot operator 213. The function of valve 184 will be described more particularly with reference to FIGURES 3A, 3B, 3C and FIGURE 4.

Passage 202 extends to a curl motor control valve 214 having three operating positions identified by reference numerals 216, 218 and 220. Passage 74 is connected to the valve 214 by a passage 222. Reverse flow of pressurized fluid from the valve 214 to the passage 74 is inhibited by one-way flow check valve 224. A drain passage 226 extends from valve 214 to the tank or sump region.

Pressure distribution passages 228 and 230 extend, respectively, to working chambers 98 and 100 of the curl motor 48.

The valve 214 normally is biased to a neutral, balanced position by centering springs 232 and 234. When the valve 214 assumes a balanced or neutral position, as shown in FIGURE 2B, passages 222, 226, 228 and 230 are blocked, although communication is established through the valve 214 between passage 202 and the passage 236. If valve 214 assumes the position 216, pressure is distributed from passage 222 to the valve 214 to the passage 230 and the working chamber 100, thereby causing the bucket to curl. Communication between passages 202 and 236 at that time is blocked. On the other hand, if the valve 214 is shifted to position 220, passage 222 is brought into fluid communication with passage 228 and passage 230 is brought into communication with the vent passage 226. This causes the bucket to dump. Again, communication between passage 202 and passage 236 is blocked.

A pair of backhoe swing motors is indicated schematically in FIGURE 2C by reference characters 238 and 240. Each of them includes a fluid cylinder and a fluid operated piston as shown at 242 and 244, respectively. The pistons are connected together by an articulated linkage arrangement as shown at 246. This linkage arrangement is connected mechanically to pivot member 64 which is mounted for vertical oscillation about swing axis 248, a suitable chassis-supported bearing structure being provided for this purpose.

Pressure distribution to and from the fluid motor 238 on the rod side of the piston 242 takes place through passage 250. Corresponding pressure distribution to and from the rod side of the piston 244 of the motor 240 takes place through passage 252. Passages 250 and 252 extend to a control valve 254 for the swing motors. This valve, like the other control valves 124, 184 and 214 can be operated hydraulically and manually, as will be explained more particularly in other parts of this disclosure. Valve 254 is a three-position valve, the three operating positions being indicated by reference characters 256, 258 and 260. The valve is biased to a central neutral position by centering springs 262 and 264. Hydraulically operated pilot operators 266 and 268 are situated on either side of the valve 254 to position appropriately the valve as will be explained subsequently. The operation of these hydraulic operators can be overruled, however, by a manual control schematically indicated at 270. This overrides the semi-automatic function of the valves.

When the valve 254 assumes the position shown, communication is established through the valve between passages 236 and 272. When it assumes either of the two other positions, however, this communication is blocked.

In position number 258, valve 254 blocks passages 250 and 252. A pressurized passage 274, which is connected to passage 74, also is blocked. In a similar fashion, a vent passage 276 leading to the tank or sump is blocked. A one-way flow check valve 278 inhibits transfer of pressurized fluid from the valve 254 to the passage 74.

When the valve 254 is shifted to position number 256, passage 274 is brought into fluid communication with passage 252. Passage 250 is exhausted through passage 276.

One-way flow check valve 280 is positioned in passage 252 to prevent reverse flow of pressurized fluid, although pressure distribution through passage 252 to the motor 240 is uninhibited. A corresponding one-way flow check valve 282 is positioned in passage 250 for accommodating flow through passage 250 to the motor 238 while inhibiting reverse flow.

When the valve 254 assumes the position 256, pressure is distributed to the rod side of the piston 244 of the motor 240. At the same time passage 252 becomes pressurized, a signal pressure is distributed through passage 284 to a hydraulic pilot operator 286 for a two-position shuttle valve 288. This causes valve 288 to assume a first position 290 which will establish communication between bypass flow passage 292 and 294, thus accommodating a flow of fluid as it is displaced from motor 238 as the member 64 swings in a counterclockwise direction.

The bypass passages 292 and 294 are in parallel disposition with respect to the check valve 282. A flow restriction 296 is situated in the bypass passage 294 to retard the rate of displacement of fluid from the motor 238, thereby controlling the rate of movement of the swing member 64.

Whenever pilot operator 286 is de-energized, a two-position valve 288 is returned under the influence of spring 298 to a full blocking position 300, thereby establishing a hydraulic lock in the motor 238.

To prevent the development of excessive pressure in the motor 238 due to the inertia forces upon completion of the swinging motion of member 64, there is provided in the circuit a pressure-limiting relief valve 302. This valve is in fluid communication with passage 250 and is designed to limit the pressure build-up in passage 252 to a predetermined value, such as about 1,800 p.s.i. Whenever passage 252 is pressurized, valve 302 is rendered inactive by reason of branch passage 304 which distributes the pressures in passage 252 to the spring side of the valve 302.

On the opposite side of the circuit for the swing motors there is a second two-position shuttle valve 306 which introduces a restriction to the exhaust of fluid from the motor 240 during acceleration of the backhoe in a clockwise direction with reference to the view of FIGURE 2C. Valve 306 includes two positions separately identified by reference numerals 308 and 310. It is located in a branch passage 312 which is situated in parallel disposition with respect to the check valve 280 in passage 252. A flow restriction 314 is located in the branch passage 312.

Valve 306 normally assumes position number 308 under the influence of valve spring 316. It can be shifted to the flow-directing position 310 by a hydraulic pilot operator 318. Position number 308 is a flow-blocking position.

Upon movement of the valve 254 to a position number 260, passage 252 is drained through passage 276 and passage 250 is brought into communication with pressurized passage 274. This causes the swing member 64 to move in a clockwise direction and fluid is displaced from fluid motor 240 while pilot operator 318 becomes pressurized by reason of a fluid connection between it and pressurized passage 250 through signal passage 320. The fluid displaced from the motor 240 then passes through flow restriction 314, thus controlling the motion of the backhoe as the swing frame 17 is swung through an arc.

Valve 214 is provided with hydraulic pilot operators 322 and 324 which control automatically the displacement of the valve 214 to effect movement of the bucket in timed relationship with respect to the swinging operation caused by the swing cylinders 240 and 238. This will be described subsequently. The hydraulic pilot operators 322 and 324 can be overruled, however, by a manual control schematically indicated at 326.

Passage 272 communicates with the right-hand stabilizer motor valve 328. This valve has three operating positions indicated at 330, 332 and 344. The positions are selected manually by means of a manual operator 336.

Valve 328 normally is centered in a neutral position, as shown in FIGURE 2B, by a pair of centering springs 338 and 340. When the valve 328 is shifted in a left-hand direction, as viewed in FIGURE 2C, passage 74 is brought into fluid communication through a one-way flow check valve 342 with a stabilizer motor feed passage 344. This causes the right-hand stabilizer motor to extend. A second feed passage extending to the working chamber 80' is shown at 346. It communicates with drain passage 348 when the valve 328 assumes position number 334. Communication between passage 272 and a series related passage 350 is interrupted at this time. Passage 350 in turn extends to the sump region through a filter 352.

If the valve 328 is shifted to position number 330, passage 346 is pressurized and passage 344 is exhausted. This causes the stabilizer motor 70' to retract. Again communication between passage 272 and passage 350 is interrupted.

In preparing for a digging operation, the operator can employ the semi-automatic features of the system by shifting the main manual valve 124 to position number 134. This is done following the suitable positioning of the bucket into a digging attitude by using valve 124, valve 184, valve 214 and valve 254. This prepositioning can be done manually by use of the manual valve operators described previously. As the main manual valve 124 now is positioned to position number 134 to initiate the semi-automatic dig circuit functions, pressurized fluid is directed to the crowd motor 52, thus pressurizing working chamber 88. The chamber 86 of the motor 52 is exhausted to vent passage 158. Passage 152, which receives regulated pressure of 300 p.s.i. from valve 154 is brought into communication with passage 182 and passage 180 is exhausted through vent passage 156. This 300 p.s.i. pressure in passage 182 is distributed to a detent pilot valve 354. This will be described more particularly with reference to FIGURE 5.

Valve 354 is a two-position valve having operating positions 356 and 358. Valve 354 normally is biased by a spring 360 to the position 356. It is adapted to respond, however, to a signal pressure distributed to it through signal pressure passage 362, which in turn is connected directly to passage 160 extending to the crowd motor. Movement of the valve from position 356 to position 358 takes place whenever passage 362 is pressurized beyond a predetermined pressure, e.g. 1700 p.s.i. The valve returns to position 356 whenever pressure in passage 362 drops substantially below the pressure required to shift to position 358. A spring loaded detent 364 precisely defines the hysteresis and offers a detent resistance to vibratory displacement of the valve from one position to another.

In one preferred embodiment of our invention, the valve 354 is caused to shift from position 356 to position 358 whenever the signal pressure in passage 362 reaches a value which may be approximately 1750 p.s.i. The pressure at which the valve 356 may be caused to respond, however, can be readily adjusted by the operator to any desired value. If the digging operation is to occur on solidly packed ground where the load on the bucket will be high, the setting of the valve 354 can be increased so that a response to a signal pressure as high as 2200 p.s.i. occurs. On the other hand, if the bucket is to be used for digging loose dirt, the valve 354 can be set to respond to a signal pressure as low as 1000 p.s.i.

A drain passage 366 connects the valve 354 to the tank or sump. When the valve assumes the position 356, drain passage 366 is connected to output passage 368 and pressurized passage 182 is blocked. On the other hand, when the valve 354 is shifted in response to a signal pressure in passage 362, pressurized passage 182 is brought into communication with output passage 368 and the drain passage 366 is blocked.

The pressure in passage 362 does not reach the calibrated value for initiating a valve response until the crowd motor becomes overloaded due to an increased load on the bucket or due to movement of the crowd piston to its extreme extended limit. In any event, when the valve 354 is triggered, the regulated pressure in passage 182 may be 300 p.s.i. It then is made available to passage 368. This 300 p.s.i. operating pressure is distributed then through passage 368 to a two-position shuttle valve 370 which also will be described subsequently with reference to FIGURE 6. Valve 370 comprises a two-position valve element having operating positions 372 and 374. It normally is urged by valve spring 376 to the position 372, thereby causing it to establish communication between passage 368 and a passage 378. A feedback pressure passage 380 extends from pressurized passage 368 to the spring side of the valve 370, thereby tending to maintain it in the position number 372 whenever the detent valve 354 is in position number 358.

Another passage 382 is connected to valve 370. This passage is blocked whenever the valve 370 assumes the position 372.

When the crowd cylinder becomes overloaded, the signal distributed through passage 362 to the detent valve 354 causes the valve to shift, thereby pressurizing passage 368 with a regulated 300 p.s.i. pressure. This pressure is distributed initially through passage 368 and through the shuttle valve 370 to the passage 378, which in turn triggers the operation of the valve 214, causing the latter to assume position number 216. As this occurs, passage 222, which communicates directly with the line pressure passage 74, is brought into communication with passage 230 which extends to the curl motor. At this time the pressure in passage 368 is distributed through passage 380 to the right-hand side of the shuttle valve 370, thereby maintaining the valve in the position shown. As will be explained subsequently, shuttle valve 370 assumes position 374 which causes passage 382 to communicate directly with passage 378 as passage 368 becomes blocked. Passage 382 communicates with the left-hand side of the valve 370 through a branch passage 384.

The curl piston will continue to move as pressure is built up in chamber 100 until the piston reaches the end of the stroke or until the curl motor becomes overloaded due to an increase in load on the bucket. When the pressure in passage 230 reaches a predetermined value, which occurs when the curl motor becomes overloaded, that pressure is received in a signal pressure passage 386 extending from passage 230 to detent valve 388. This valve is similar in form to valve 354 previously described. It includes two operating positions separately identified in FIGURE 2B by reference characters 390 and 392. Valve 388 normally is held in the position shown under the influence of spring 394. It can be shifted, however, to position 392 when the pressure in passage 386 reaches a value of approximately 1750 p.s.i. or any other pressure for which the valve might be calibrated. Calibration of the valve can be adjusted by the vehicle operator by changing the tension on the spring 394. In this respect it is similar to the manual adjustment feature of valve 354. A detent 396 increases shifting effort upon movement of the valve 388 from one position to the other.

Passage 368 serves as the feed passage for the valve 388. Communication is established between valve 388 and the passage 368 through passage 398. When the valve 388 assumes the position shown, communication is established between passage 400, which extends to the valve 388, and the tank or the sump 402. Passage 398 is blocked. On the other hand, if the signal pressure in passage 368 reaches a calibrated value, the valve will shift to position 392, thereby establishing free communication between passage 398 and passage 400 as the port leading to the tank 402 is blocked.

When the calibrated signal pressure in passage 386 is achieved, the valve 392 shifts, thereby causing the regulated pressure in passage 393 to transfer to passage 400. This in turn pressurizes the hydraulic pilot operator 213 for the lift cylinder control valve 184. This causes valve 184 to shift to position number 208 to establish communication between line pressure passage 198 and passage 188 which extends to the lift side of the lift cylinder motor 56. This tends to raise the backhoe unit, thereby tending to relieve the overload on either the crowd cylinder or the curl cylinder or both. Of course, unless the curl motor is overloaded in the first instance, the passage 40 which extends to the first hydraulic pilot operator 213 will be blocked. Thus an overload on the crowd cylinder without a corresponding overload on the curl cylinder will not result in a response of the lift motor.

In a similar fashion, unless the crowd cylinder is overloaded, no feed pressure will be made available to passage 368 and to passage 398. Even though the curl cylinder might become overloaded and the valve 388 might become shifted in response to a pressure build-up in passage 386, the lift motor will not respond since there will be no pressure feed through passage 398. Thus a relief of the overload by movement of the lift motor can occur only if both the curl motor and the crowd motor are overloaded simultaneously. If, in fact, both the crowd motor and the curl motor are overloaded, a response of the lift motor to this overload can relieve either the curl motor overload or the crowd motor overload or both.

Upon movement of the piston for the lift motor 56, fluid is displaced from chamber 94 through passage 186 and through the valve 184 to the tank passage 206. During manual operation of the lift motor by the manual controls 212, the valve 184 can be shifted to position 210 which causes pressurized passage 198 to be brought into communication with chamber 94. This then causes the lift motor to assume a backhoe lowering position as fluid is displaced from chamber 92. This displaced fluid must pass under these conditions through restricted orifice 194, thereby preventing cavitation of the fluid in chamber 94 and passage 186 upon rapid drop of the boom. The valve 184 normally is maintained in the neutral or center position by opposed valve springs 404 and 406.

An overload on the lift motor will not cause necessarily a feedback of pressure to the main supply line 74 since that line is semi-isolated from the lift motor by one-way flow check valve 200. This valve will cause pressure distribution to the lift motor, but will prevent feedback of a pressure that exceeds the pressure in passage 74 when that pressure feedback is caused by operation of either the crowd motor or the bucket motor.

In a similar fashion valve 224 prevents feedback of an excessive pressure from the curl motor to the pressurized passage 74. When an overload occurs in the curl motor due to operation of the lift motor or the crowd motor, one-way flow check valve 224 prevents feedback of excessive pressure from the crowd motor when it becomes overloaded due to the operation of either the lift motor or the curl motor. The corresponding valve 278 prevents distribution of the back pressure from the swing motors. A similar function is provided by the stabilizer motors by valves 118 and 342.

The valves will function in the foregoing fashion as the bucket is filled. When the operator notes that the digging operation of the bucket is completed he then can initiate manually the retraction and dump cycle. The operator does this by shifting valve 124 to position 126. At that time pressurized passage 148 is brought into communication with passage 162 which extends to the working chamber 86. This causes the crowd motor to retract. The fluid displaced from chamber 88 passes through passage 160 and through valve 124 to the tank passage 158. Passage 182 becomes exhausted through valve 124 and through tank passage 156. Pressurized passage 152, which receives regulated pressure from the regulator valve 154, is brought into communication with passage 180.

Restriction 164 functions in a manner similar to restriction 194 to prevent cavitation in the crowd circuit. It controls the rate of movement of the crowd cylinder during the initiation of the digging cycle by controlling the rate of displacement of fluid from the chamber 86. It does not control, however, the rate of movement of the crowd motor during the retraction cycle with which we are now concerned since the oneway flow check valve 166 bypasses the restriction 164. As the retraction cycle continues, pressure is built up in passage 180 and is distributed to a swing control valve 408. This valve has two operating positions 410 and 412. It normally is biased to position number 410 by a valve spring 414. At this time communication is established between passages 180 and a passage 416. Passage 418, which also communicates with valve 408, at this time is brought into communication with a drain passage 420.

The valve 408 can be operated by means of a cam 422 against the opposing influence of spring 414. The cam 422 shifts the valve 408 to position 412 when the cam follower 424 reaches a point on the cam that corresponds to a predetermined arc of motion of the backhoe about the backhoe swing axis. The position of the cam 422 with respect to the follower 424 can be controlled initially by the operator and set at a value that will give the operator the desired swinging motion of the backhoe for any particular digging operation. As soon as the predetermined travel of the backhoe occurs, the valve 408 is shifted to position number 412, thereby establishing communication between passage 180 and passage 418 and exhausting passage 416 through the drain passage 420.

If we assume for the moment that the valve 408 is in the position number 410, passage 416 will be pressurized at this stage of the retraction cycle. This passage communicates with a two-position valve 428. This valve includes a movable element having two operating positions 430 and 432. It is biased by a spring 434 to position 430. It can be shifted to the opposite direction against the force of spring 434, however, by pressure which is distributed to the right-hand end of the valve through signal passage 436.

Passage 416 communicates through valve 428 with passage 438. This passage extends to passage 382, thereby causing the latter to be pressurized. This in turn shifts the shuttle valve 370 in a right-hand direction to position 374. This then causes passage 382 to communicate through the valve 370 with passage 378. Thus a pressure signal is distributed to the hydraulic pilot operator 324 for the valve 214. This causes the valve 214 to shift to position number 216, thereby establishing fluid communication between pressurized passage 222 and passage 230 which extends to the pressure chamber 100 for the curl motor. Passage 228 and the working chamber 98 of the curl motor 48 are exhausted through the valve 214 and the drain passage 226.

The position of the valve 428 is controlled by a hydraulic timing circuit comprising valves 440 and 442 as well as accumulator 444. This circuit, as now will be explained, controls the arc of motion of the dipstick portion of the backhoe unit during the retraction cycle.

The pressure build-up that occurs in passage 416 causes the pressure in passage 438 to increase initially, as previously explained. This same pressure build-up in passage 416, however, causes pressurized fluid to pass through passage 446 and through flow restricting orifice 448 to the accumulator chamber 450. The pressure in chamber 450 of the accumulator 444, as it increases in value, moves piston 452 of the accumulator against the force of spring 454. This increases the volume of the accumulator chamber 450. The resulting pressure build-up in chamber 450 is distributed through passage 436 to the valve 428. When the predetermined value is reached, valve 428 shifts to the position 432, thereby establishing direct communication between passage 416 and a cooperating pressure passage 456. At the same time passage 438 is exhausted through the valve 428 and through drain passage 458. The degree of restriction of the orifice 448 can be controlled by the operator and in this way the time required to fill the accumulator chamber 450 can be controlled. Thus the angular motion of the dipstick portion of the backhoe unit can be controlled.

Since passage 382 now becomes exhausted through the valve 428, the spring 376 returns the valve 370 to position number 372. Thus passage 378 becomes exhausted through valve 370 and through passage 368, the latter communicating with drain passage 366 through the valve 354. Valve 354 at this time, of course, is in the position shown since signal pressure passage 362 is exhausted through the manual control valve 124. Passage 378 being exhausted, the valve 214 again is returned to the central or neutral position so that the extending motion of the curl motor ceases. Both passages 228 and 230 become blocked by the valve 214 at this instant. Transfer of fluid from passage 382 to passage 438 is controlled by a flow restricting orifice 460. Free fluid flow from passage 438 to passage 382 is established, however, by one-way flow check valve 462 which is in parallel relationship with respect to the orifice 460.

Shifting motion of the valve 428 in response to a predetermined pressure build-up in the accumulator chamber 450 results also in distribution of regulated pressure to passage 456. This pressure is maintained at a desired value by regulator valve 154. The pressurized passage 456 communicates with a lift control valve 464. This is a two-position valve having a movable valve element adapted to assume either position 466 or position 468. It is operated by means of a cam 470 and a cam follower 472, the latter being connected mechanically to the valve 464. The cam 470 is connected to the movable lift motor just as the cam 422 is connected to the movable swing motors. The position of the cam 470 with respect to the follower 472 is under the control of the vehicle operator. He can set the cam at a desired position depending upon the particular digging requirements. Thus the angular movement of the boom of the backhoe unit can be controlled during operation.

During the early stages of the retraction cycle, passage 456 is brought into communication by valve 464 with passage 474. The pressure in passage 474 acts as a signal for a two-position shuttle valve 476. This valve has two operating positions, 478 and 480. It functions during the portion of the operating cycle previously defined to establish communication between passage 400 and the hydraulic pilot valve operator 213. It does this when it assumes the position shown. The valve portion 476 normally is maintained in that position by the valve spring 482. When the passage 474 is pressurized, however, valve 476 shifts to position 480, thereby blocking passage 400 and establishing communication between passage 474 and the pilot operator 213. At a time prior to the shifting movement, passage 400 was exhausted through the valve 388 and the drain passage 402. Of course, if the signal pressure in passage 386 is sufficient to maintain the valve 388 is position number 392, passage 400 would be blocked. But regardless of whether passage 400 is blocked or exhausted, no signal pressure would be made available to the pilot operator 213. It is only after the valve 476 shifts that a usable signal is received by the pilot operator 213 at this stage in the retraction cycle.

Transfer of fluid from valve 464 to the valve 476 occurs through one-way check valve 484. Transfer of fluid in the opposite direction, however, is restricted by a flow restricting orifice 486 situated in parallel relationship with respect to valve 484.

Upon receiving a pressure signal, the hydraulic pilot operator 213 shifts the valve 184 to position 208. This causes working pressure to pass from passage 198 to the passage 188, thereby causing the lift motor to lift the backhoe unit. Chamber 94 is brought into communication with the drain passage 206. This motion of the lift cylinder continues until the cam 470 causes the follower 472 to shift the valve 464 to position number 468. At that time passage 474 becomes exhausted through valve 464 and passage 456, which receives regulated pressure from valve 154, is brought into communication with passage 488. Two responses occur to this shifting movement of valve 464. In the first instance, valve 476 loses its actuating signal. Therefore, spring 482 returns it to position number 478, bringing again passage 400 into communication with the pilot operator 213. This exhausts the pilot operator, thereby allowing the valve 184 to return to the position shown and the lifting motion of the lift motor ceases. An abrupt stopping of the boom 26 is avoided by requiring the fluid exhausting from passage 474 to pass through the restriction 486. Secondly, the passage 488 becomes pressurized since it communicates now with passage 456. The regulated pressure of valve 154 then is distributed to a two-position valve 490. This valve can distribute pressure from passage 488 to either one or the other of the passages 492 or 494 extending to the hydraulic pilot operators 268 and 266, respectively. It does this as it is adjusted by the vehicle operator to either position number 496 or position number 498 by a suitable manual linkage. When passage 492 is pressurized, the other passage 494 is exhausted and vice versa. Thus the swing cylinders will swing the backhoe in either one direction or the other depending upon the position that is selected by the operator for the valve 490.

The passage 176, which communicates directly with passage 456, becomes pressurized whenever the valve 428 is shifted to position number 432. This occurs, as explained previously, when the accumulator chamber 450 becomes completely filled. Thus the signal pressure in passage 176 actuates the valve 168 to the position 174, thereby blocking distribution of pressure to the working chamber 88 of the crowd motor.

Swinging motion of the swing cylinders continues until the cam 422 shifts the follower 424 and the valve 408 to position number 412. This exhausts passage 416 through drain passage 408. This then will cause a reduction in the pressure of the accumulator chamber 450. A quick response is obtained because of the free-flowing action of the one-way flow valve 502. The valve 428 then immediately will shift to the position number 430. This also exhausts passage 456 and passage 488 (FIGURE 2B) which communicates with passage 456 when valve 464 is in position 468. The signal then applied to the hydraulic pilot operator 266 or 268 is relieved, thus allowing the springs 264 and 262 to return the swing control valve 254 to the neutral position. This stops the swinging motion. Secondly, movement of the valve 408 to position 412 causes pressurized passage 180 to be brought into communication with passage 418, thereby pressurizing the hydraulic pilot operator 322. This upsets the neutral condition of the valve and causes it to shift to position number 220, thus bringing pressurized passage 222 into communication with the working chamber 98. Working chamber 100 is brought into communication with the drain passage 226. This causes the bucket to dump. While this dumping action is occurring, the pressure signal to passage 176 is exhausted since passage 456 is exhausted, as explained previously. Thus the valve 168 again will be caused to shift to position 172. This then brings passage 160 again into communication with the working chamber 86 through valve 124. Thus the crowd motor extends the dipstick as the bucket is dumping.

If the crowd motor reaches the end of its stroke before the timing device (valve 440 and accumulator) has functioned, passage 441 distributes a signal from passage 162 to trigger valve 442. This bypasses orifice 448, and the valve 428 then is shifted immediately to position 432.

When the operator shifts the valve 124 to position number 126 to initiate the retraction cycle and the dump cycle, a slight time delay occurs following shifting movement of the valve 124 before the bucket begins to close. This is due to the fact that the crowd cycle begins to move at a relatively slight pressure; and due to the pendulum effect, the pressure builds up as the dipstick moves outwardly. When the pressure in the crowd motor reaches a value of 300 p.s.i., a pressure then appears in line 152 and in passage 180. At that instant the bucket begins to close, but this instant is after the crowd cylinder has begun to move. The crowd cylinder, of course, receives pressure directly from passage 74.

When the valve 428 is shifted during the retraction cycle, the distribution of pilot pressure to the valve 214 is interrupted, as explained. The stopping of the bucket is delayed momentarily, however, by flow control orifice 460 which restricts the exhausting of the pilot signal.

The digging cycle sequence and the retraction cycle sequence can be summarized as follows: Initially, the operator positions the bucket and the dipstick portion of the backhoe unit by appropriately controlling the manually operated valves 124, 184, 214 and 254. The bucket can be positioned over the point where the digging cycle is to be started. The operator can set the calibration of the detent valves 354 and 388 to meet the particular job requirement. He also can set the angle of swing of the backhoe unit by appropriately adjusting the cam 422 with respect to the follower 424. The angle through which the lift cylinder is allowed to operate also is predetermined by the operator by appropriately adjusting the cam 470 with respect to the follower 472. The direction of the swing motors is controlled by appropriately positioning the valve 490 in one position or the other. The variable orifice 448 is set to adjust the arc of dipstick travel during the retraction cycle.

By moving the crowd lever to the so-called crowd-in position, the operator can shift valve 124 to position number 134, thus actuating the crowd cylinder as explained. As the crowd cylinder extends, and when the crowd motor experiences an overload condition, the hydraulic signal produced initiates operation of valve 354, thus causing the bucket cylinder to extend or to curl the bucket in. As a result of this combined action of the crowd motor and the bucket motor, extension of the bucket motor cylinder may relieve the overload condition on the crowd motor which will stop the bucket motion and allow the crowd motor to proceed. Alternatively, it might be possible for the bucket motor to experience an overload condition without relieving the crowd overload. When both the crowd motor and the bucket motor are overloaded, the lift cylinder will be caused to extend due to the action of valve 388 which is triggered by overload pressure in passage 386. This will cause the lift motor to extend, thus raising the boom portion of the backhoe unit. This action will continue until the overload condition on either the crowd motor or the bucket motor is relieved.

When the bucket is filled, the operator releases the crowd lever to stop the digging cycle. At that point he may, if he so desires, initiate the retraction cycle. The operator does this by moving the crowd lever to the crowd-out position. This position is shown at 126. Any one of two operating sequences is then started depending upon the position of the boom portion of the backhoe unit relative to the cam control valve 464.

If the boom position is too low at the end of the digging cycle, the crowd motor initially moves outwardly until the dipstick timer shifts valve 428. Simultaneously with the movement of the crowd motor, the bucket starts to close as soon as the pressure in the crowd motor becomes great enough to operate pilot device 324. The bucket curl ceases when the timer shifts valve 428 or the crowd motor reaches the end of its stroke, whichever occurs first. When the crowd motor motion ceases, the lift motor, which was exhausted initially, moves the boom to the specified attitude controlled by the cam 470. The lift motor does not respond initially because it has a higher pressure requirement. It moves only when sufficient pressure build-up occurs following the termination of the motion of the crowd motor.

If the boom is in fact in the specified swinging attitude when the digging cycle is completed, the crowd motor moves outwardly as in the previous case. Simultaneously, the bucket starts to curl in when the pressure in the crowd motor becomes great enough to operate pilot device 324, thereby maintaining an approximately level bucket. Bucket curl is stopped when the dipstick timer shifts valve 428 or crowd motor reaches the end of its stroke, whichever occurs first. At that time the swing motors begin to operate. The direction of the swing, of course, is determined by the position of valve 490. Upon reaching a predetermined angle of swing, the cam 422 causes valve 408 to shift to position 412. Such action directs fluid pressure from passage 180 to passage 418, which powers the pilot device 322, thereby causing the bucket cylinder to retract. The bucket cylinder will continue to retract to the end of its stroke, upon which all action will cease. In the alternative the operator can stop the bucket by releasing the crowd lever to return the valve 124 to the neutral position. The operator then returns the bucket to digging position by using the four conventional levers and repeats the digging and retraction sequence.

In FIGURES 3A, 3B and 3B, I have illustrated in schematic form the operation of the manual valve 214, which is identical to the operation of valves 184 and 254 except that valve 184 is pilot operated in only one direction. FIGURE 3A shows valve 214 in the neutral position. Valve 214 includes a valve element 501 slidably positioned in a valve chamber 503. Valve element 501 includes spaced valve lands 504, 506 and 508. Passage 222 communicates with valve port 510. Passage 230 communicates with port 512 and passage 228 communicates with port 514. The exhaust region communicates with the valve chamber 502 through exhaust ports 516 and 518.

When the valve element 501 shifts in a left-hand direction, communication is established between ports 514 and 516. At the same time communication is established between pressure port 510 and the port 512. Motion of the valve element 501 is established by a hydraulic pilot operator 520 which comprises a movable cylinder 522 within which is slidably positioned a piston 524. The piston normally is biased to a central neutral position by a pair of opposed springs 526 and 528. The piston 524 cooperates with the cylinder 522 to define a pair of opposed working chambers. Pressure can be distributed to these chambers through pressure ports 530 and 532, respectively. By appropriately controlling the distribution of pressure to either one or the other of these ports, the position of the piston 524 with respect to the cylinder 522 can be controlled. For example, if port 532 is pressurized while port 530 is exhausted, the piston 524 with respect to the cylinder 522 will be moved to the position shown in FIGURE 3C. This occurs without movement of the cylinder 522 with respect to a fixed point.

The cylinder is connected mechanically to a manual control lever 534. Centering springs 536 and 538 are situated on either side of a spring seat 540 carried by the manual control lever operating linkage. The springs tend to maintain the manual control lever in a balanced neutral position unless the lever is in fact operated by the operator to one position or the other.

In FIGURE 3B the operator has moved the lever 534 in a left-hand direction, thereby compressing spring 538. This shifts cylinder 522 in a left-hand direction and, because of the spring connection between the cylinder 522 and the valve element 501, the valve element 501 is shifted in a left-hand direction. Thus the operator can overrule the hydraulic pilot operation if desired. On the other hand, if automatic operation is desired, the hydraulic pilot operator can shift the valve without causing movement of the manual control lever.

FIGURE 4 shows an actual working embodiment of the hydraulic-mechanical valve controlling mechanism of FIGURES 3A, 3B and 3C. The centering springs are shown at 526 and 528, just as in the case of FIGURES 3A, 3B and 3C. These springs serve the triple purpose of forcing the actuating fluid to exhaust, returning the pistons 542 and 543 to their unoperated positions and providing a solid mechanical link through the cylinder assembly 520 during manual operation of the control lever 534.

The sealing gland 554 and the piston 543 define a pressure chamber 560, which can be pressurized by distributing fluid pressure to it through port 530. The piston rod 556, in addition to being fastened to piston 543, forms a part of the main valve spring centering device 541 and is attached to the main valve control handle 534 at pivot point 535. The centering spring 538 holds the piston rod 556 and piston 543 stationary when pressure is applied to chamber 560. Therefore, the cylinder 522 must move upward, as viewed in FIGURE 4. This motion of cylinder 522 is transmitted to the valve operating rod 550 through the spring 526, moving the valve spool 184 to the right as viewed in FIGURE 3C. Bushing 702 is pinned to the piston rod 556 and serves to limit the stroke of the cylinder assembly 520. It serves also as a spring seat for the spring centering device 541.

The piston 543, held against the gland 554 by spring 528 in the unoperated position, and the piston 542, held against the snap ring 549 by spring 526 in the unoperated position, define a pressure chamber 544 which can be pressurized by distributing fluid pressure to it through port 532. The application of pressure to chamber 544 forces the piston 542 downward, as viewed in FIGURE 4, against the stop collar 552, thereby directly moving the valve operating rod 550 and valve spool 508 to the left as viewed in FIGURE 3C.

Thus by placing the pilot cylinder assembly 520 between, and in series with, the valve spool 508 and the valve centering device 541, the valve can be pilot operated without the operator experiencing any movement of the manual control lever 534. However, the hydraulic action can be overruled by manual operation of the control lever 34. In addition, the presence of the pilot cylinder 520, when not being operated, in no way affects manual operation of the valve.

The detent valves can be identical and, therefore, only one of them will be described in detail with reference to FIGURE 5. The valve body is internally ported with the valve 354 feeding the valve 388.

Valve 354 comprises a valve element having three spaced valve lands 562, 564 and 566. A fluid pressure intake port, shown at 568, which is the same as passage 182 shown in FIGURE 2A, is located between lands 564 and 562 when the valve element 566 assumes the position shown. A discharge port for the valve 354 is shown at 570 which corresponds to passage 368 in FIGURE 2A. When the valve element 566 assumes the position shown, port 570 is situated between lands 566 and 564.

A sump port 366 is located adjacent the edge of land 566.

Located between the edge of land 652 and the end of the valve is a pair of detent grooves 572 and 574. These are engaged by detent balls 576 and 578 which in turn are spring loaded, ball 576 being loaded by detent spring 580 and ball 578 being loaded by detent spring 582. This spring 582 is common to the other valve 388.

A pressure signal in passage 362 is distributed to the lower end of the valve element for valve 354 through a port 584. When the valve assumes the position shown, communication between ports 568 and 570 is interrupted. At the same time port 570 is brought into communication with the exhaust region through port 366. When the pressure signal in port 584 reaches a predetermined value, however, the valve will be shifted against the opposing influence of the detents and the bias springs 581 and 583 so that balls 576 and 578 will engage detent groove 574. At that time passage 398 and port 570 are brought into communication with port 568. Communication with the exhaust port 366 is blocked.

This detent valve can be characterized as a dynamically stable valve since it tends to seek a positive position in either of its two operating positions. There is no tendency for valve operating force cancellation as in certain prior art valve mechanisms. By strategically locating the passage 398 with respect to the port 568 and with respect to the exhaust port 570, the forces acting on the valve spool land 562, due to the acceleration of the fluid as it enters port 568, will tend to resist movement of the valve spool in an upward direction as viewed in FIGURE 5. In valves of prior art mechanisms used presently in circuits of this type, the hydrodynamic forces acting on the valve element are in the opposite direction, thereby tending to supplement the valve-actuating force and upsetting the calibration of the valve.

In FIGURE 6 I have shown an actual working embodiment of valves 370 and 476. They simply are two-position shuttle valves which are actuated to one position by their associated valve springs and to the other position under the influence of a signal pressure. Flow control orifice 460 and flow check 462 are formed in the fitting 586 which is secured in the valve body which defines a valve chamber for shuttle valve 370. The body itself, which is common to valves 476 and 370, is identified by reference character 588.

The hydraulic pilot operator 213 communicates with the spring chamber for spring 482 through a port 400. The other spring chamber for valve spring 376 communicates with the signal pressure passage 378 through a port 368.

In FIGURE 7A I have shown the main regulator valve 154 and that portion of the manual valve 124 which directs the interconnection of passages 180, 182, 156 and 152, shown schematically in FIGURE 2A, and designated valve 700 in FIGURE 7A. Both valves are located in a common housing 594.

The valve 154 includes a valve sleeve 596 within which is positioned a movable valve element 598. Situated in the valve element 598 is a valve stem 600 which is urged in an upward direction as viewed in FIGURE 7A by a valve spring 602. This spring is situated in a valve chamber that is closed by a closure plug 603. The chamber is vented through a vent port 604.

The intake port communicates with an annular space 606 surrounding the sleeve 596. The movable valve element 598 is formed with a conical upper end which registers with and seats upon the end of the bore 608 within which valve element 598 is situated. The upper end of valve element 598 receives a ball valve element 610 which is adapted to engage rod 600. It is subjected to the pressure that exists in the output pressure passage 612 for the valve. Valve element 598 normally is urged in a downward direction, as viewed in FIGURE 7A, by valve spring 614 and pressure in passage 612, and urged upward by spring 602.

It is apparent that the valve assembly of FIGURE 7A will establish a regulated pressure in passage 612 that is dependent upon the calibration of springs 602 and 614.

The output pressure for the valve 154 is received by valve 700 through a passage 612 which corresponds to the previously described passage 152.

Passage 180, which is pressurized during the retraction cycle, communicates with the valve bore 615 for the valve 700 above the top valve land. Passage 568, which is pressurized during the digging portion of the cycle, communicates with the chamber 615 between the second and third valve lands from the top as viewed in FIGURE 7A. The closure plug 618 seals the upper end of the chamber 615 by appropriately positioning the valve spool 620 for the valve 700. Pressure distribution to port 180 or to port 568 can be controlled. When one is pressurized the other is exhausted through the sump port 604.

Movement of the manual valve 700 is resisted by a mechanical ball detent 622 which comprises a series of balls and a series of detent springs 624. These detent balls 622 engage the valve spool 620 at a reduced diameter portion 626. The operator then experiences a detent feel when the valve is shifted from one operating position to the other.

Having thus described a preferred embodiment of our invention, what we claim and desire to secure by United States Letters Patent is:

1. A hydraulically operated prime mover comprising a first work performing member mounted pivotally on a relatively stationary chassis, a second work performing member mounted pivotally on said first work performing member, first hydrostatic motor means having pressure operated parts connected respectively to said chassis and said first work performing member for adjusting the latter with respect to said chassis, second hydrostatic motor means having pressure operated parts connected to said first and second work performing members for adjusting the latter with respect to the former, a hydrostatic pressure source, conduit structure connected to said pressure source and including separate circuit portions extending respectively to each of said motor means, first and second multiple position directional valves situated respectively in said first and second circuit portions, each valve being adapted to control distribution of working pressure to and exhausting working pressure from their respective motor means, a pressure operated pilot operator for at least one of said directional valves for triggering the operation of the latter in response to changes in a control pressure signal acting thereon, manual means for overruling the influence of said pilot operator, a control pressure regulator valve means communicating with said pressure source for developing a control pressure signal, a shuttle valve means in fluid communication with the regulated pressure output side of said regulator valve means, said shuttle valve means being adapted to communicate with said pilot valve operator whereby it is effective to distribute said regulated pressure signal to said operator when it assumes one operating position and to interrupt the signal distribution when it assumes another operating position, said shuttle valve means communicating with said motor means associated with the other directional valve whereby it responds to an overload of said last-named motor means to signal the operation of said pilot valve operator.

2. A hydraulically operated earth mover having a plurality of articulated members, a first one of said members being pivoted on a vehicle chassis, a second load carrying articulated member pivoted on said first articulated member, first and second hydraulically operated motor means for adjusting respectively said first and second members, a source of fluid pressure, conduit structure connecting said pressure source and said fluid motors, pressure distribution valve means situated in said conduit structure and partly defining the same for controlling distribution of pressure to each of said motor means selectively, means for manually operating each of said valve means for selectively interrupting and establishing fluid communication between said pressure source and each of said motor means, hydraulically operated pilot operators for the pressure distribution valve means for actuating each of them, plural shuttle valve means in said conduit structure communicating with said signal source and responsive to a predetermined pressure build-up in one of said motor means for distributing a pressure signal to the pilot operator for another distribution valve means, one shuttle valve means forming a part of a first fluid circuit portion interconnecting the hydraulic pilot operator for one motor means and said signal source, a second shuttle valve means defining in part a second fluid circuit portion interconnecting the hydraulic pilot operator for a second motor means and said signal source, signal passages extending from said signal source to each of said fluid circuit portions to supply the latter with said signal pressure, and manually controlled means for overruling the automatic operation of said pilot valve operator.

3. A hydraulically operated automatic digger comprising a main portion, an arm portion and a load carrying portion arranged in articulated relationship with respect to each other, means for mounting one end of said main portion on a vehicle chassis, a lift motor having hydraulically operated parts connected respectively to said chassis and to a part of said main portion, a crowd motor having hydraulically operated parts connected respectively to said arm portion and to said main portion, a curl motor having hydraulically operated parts connected respectively to said arm portion and said load carrying portion, a source of fluid pressure, conduit structure connecting said pressure source and said motors, pressure distribution valve means situated in said conduit structure and partly defining the same for controlling distribution of pressure to each of said motors selectively, means for manually operating each of said valve means for selectively interrupting and establishing fluid communication between said pressure source and each of said motors, hydraulically operated pilot operators for the pressure distribution valve means for said motors for actuating each of them, a pressure signal source, a first valve means in said conduit structure communicating with said signal source and responsive to a predetermined pressure build-up in one motor for distributing a pressure signal to the pilot operator for another motor, and another valve means in said conduit structure for distributing a pressure signal to the pilot operator for a third motor in response to a predetermined pressure build-up in the other two motors.

4. A hydraulically operated automatic backhoe unit comprising a main boom portion, a dipstick portion and a bucket portion arranged in articulated relationship with respect to each other, means for mounting one end of said boom portion on a vehicle chassis, a lift motor having hydraulically operated parts connected respectively to said chassis and to part of said boom portion, a crowd fluid motor having hydraulically operated parts connected respectively to said dipstick portion and to said boom portion, a bucket curl motor having hydraulically operated parts connected respectively to said dipstick portion and to said bucket portion, a swing motor having hydraulically operated parts connected respectively to said chassis and to said boom portion, a source of fluid pressure, conduit structure connecting said pressure source and said fluid motors, pressure distribution valve means situated in said conduit structure and partly defining the same for controlling distribution of pressure to each of said motors selectively, means for manually operating each of said valve means for selectively interrupting and establishing fluid communication between said pressure source and each of said motors, hydraulically operated pilot operators for the pressure distribution valves for said lift motor and said curl motor and said swing motor for actuating each of them, valve means in said conduit structure responsive to a predetermined pressure build-up in said conduit structure for distributing a pressure signal to the pilot operator for said curl motor, and another valve means in said conduit structure for distributing a pressure signal to said pilot operator for said lift motor means in response to a predetermined pressure build-up in said crowd motor and in said curl motor.

5. A hydraulically operated automatic backhoe unit comprising a main boom portion, a dipstick portion and a bucket portion arranged in articulated relationship with respect to each other, means for mounting one end of said boom portion on a vehicle chassis, a lift motor having hydraulically operated parts connected respectively to said chassis and to part of said boom portion, a crowd fluid motor having hydraulically operated parts connected respectively to said dipstick portion and to said boom portion, a bucket curl motor having hydraulically operated parts connected respectively to said dipstick portion and to said bucket portion, a source of fluid pressure, conduit structure connecting said pressure source and said fluid motors, pressure distribution valve means situated in said conduit structure and partly defining the same for controlling distribution of pressure to each of said motors selectively, means for manually operating each of said valve means for selectively interrupting and establishing fluid communication between said pressure source and each of said motors, hydraulically operated pilot operators for the pressure distribution valves for said lift motor and said curl motor for actuating each of them, valve means in said conduit structure responsive to a predetermined pressure build-up in said crowd motor for distributing a pressure signal to the pilot operator for said curl motor, and another valve means in said conduit structure for distributing a pressure signal to said pilot operator for said lift motor in response to a predetermined pressure build-up in said crowd motor and in said curl motor.

6. A hydraulically operated automatic backhoe unit comprising a main boom portion, a dipstick portion and a bucket portion arranged in articulated relationship with respect to each other, means for mounting one end of said boom portion on a vehicle chassis, a lift motor having hydraulically operated parts connected respectively to said chassis and to said boom portion, a crowd fluid motor having hydraulically operated parts connected respectively to said chassis and to said boom portion, a crowd fluid motor having hydraulically operated parts connected respectively to said dipstick portion and to said boom portion, a bucket curl motor having hydraulically operated parts connected respectively to said dipstick portion and to said bucket portion, a swing motor having hydraulically operated parts connected respectively to said chassis and to said boom portion, a source of fluid pressure, conduit structure connecting said pressure source and said fluid motors, pressure distribution valve means situated in said conduit structure and partly defining the same for controlling distribution of pressure to each of said motors selectively, means for manually operating each of said motors selectively, means for manually operating each of said valve means for selectively interrupting and establishing fluid communication between said pressure source and each of said motors, hydraulically operated pilot operators for the pressure distribution valves for said lift motor, said curl motor and said swing motor for actuating each of them, first valve means in said conduit structure responsive to a predetermined pressure build-up in said crowd motor for distributing a pressure signal to a pilot operator for said curl motor, second valve means in said conduit structure for distributing a pressure signal to said pilot operator for said lift motor in response to a predetermined pressure build-up in said crowd motor and in said curl motor means, a pressure regulator valve communicating with said pressure source for establishing a control pressure, said first valve means forming a part of a first fluid circuit portion interconnecting the hydraulic pilot operator for said curl motor means and said pressure source, and said second valve means defining in part a second fluid circuit portion interconnecting the hydraulic pilot operator for said lift motor and said pressure source, a signal passage extending from said pressure regulator valve to each of said fluid circuit portions to supply the latter with said control pressure, and a directional valve means in said signal passage, the operating means of which communicates with said manual operating means for said crowd motor for controlling distribution of said control pressure through said signal passage.

7. A hydraulically operated automatic backhoe unit comprising a main boom portion, a dipstick portion and a bucket portion arranged in articulated relationship with respect to each other, means for mounting one end of said boom portion on a vehicle chassis, a lift motor having hydraulically operated parts connected respectively to said chassis and to said boom portion, a crowd fluid motor having hydraulically operated parts connected respectively to said dipstick portion and to said boom portion, a bucket curl motor having hydraulically operated parts connected respectively to said dipstick portion and to said bucket portion, a swing motor having hydraulically operated parts connected respectively to said chassis and to said boom portion, a source of fluid pressure, conduit structure connecting said pressure source and said fluid motors, pressure distribution valve means situated in said conduit structure and partly defining the same for controlling distribution of pressure to each of said motors selectively, means for manually operating each of said valve means for selectively interrupting and establishing fluid communication between said pressure source and each of said motors, hydraulically operated pilot operators for the pressure distribution valves for said lift motor, said curl motor and said swing motor for actuating each of them, first valve means in said conduit structure responsive to a predetermined pressure build-up in said crowd motor for distributing a pressure signal to a pilot operator for said curl motor, second valve means in said conduit structure for distributing a pressure signal to said pilot operator for said lift motor in response to a predetermined pressure build-up in said crowd motor and in said curl motor, a pressure regulator valve communicating with said pressure source for establishing a control pressure, said first valve means forming a part of a first fluid circuit portion interconnecting the hydraulic pilot operator for said curl motor means and said pressure source, and said second valve means defining in part a second fluid circuit portion interconnecting the hydraulic pilot operator for said lift motor and said pressure source, a signal passage extending from said pressure regulator valve to each of said fluid circuit portions to supply the latter with said control pressure, a directional valve means in said signal passage the operating means of which communicates with said manual operating means for said crowd motor for controlling distribution of said control pressure through said signal passage, a lift control valve in fluid communication with said directional valve means for interrupting and establishing a fluid connection between said control pressure regulator valve and the hydraulic operator for said lift motor, and cam means having an operating part thereof connected to said boom portion for controlling the mode of operation of said lift control valve whereby the angle of the arc of movement of said boom portion is dependent upon the calibration of said cam.

8. A hydraulically operated automatic backhoe unit comprising a main boom portion, a dipstick portion and a bucket portion arranged in articulated relationship with respect to each other, means for mounting one end of said boom portion on a vehicle chassis, a lift motor having hydraulically operated parts connected respectively to said chassis and to said boom portion, a crowd fluid motor having hydraulically operated parts connected respectively to said chassis and to said boom portion, a crowd fluid motor having hydraulically operated parts connected respectively to said dipstick portion and to said boom portion, a bucket curl motor having hydraulically operated parts connected respectively to said dipstick portion and to said bucket portion, a swing motor having hydraulically operated parts connected respectively to said chassis and to said boom portion, a source of fluid pressure, conduit structure connecting said pressure source and said fluid motors, pressure distribution valve means situated in said conduit structure and partly defining the same for controlling distribution of pressure to each of said motors selectively, means for manually operating each of said valve means for selectively interrupting and establishing fluid communication between said pressure source and each of said motors, hydraulically operated pilot operators for the pressure distribution valves for said lift motor, said curl motor and said swing motor for actuating each of them, first valve means in said conduit structure responsive to a predetermined pressure build-up in said crowd motor for distributing a pressure signal to a pilot operator for said curl motor, second valve means in said conduit structure for distributing a pressure signal to said pilot operator for said lift motor in response to a predetermined pressure build-up in said crowd motor and in said curl motor, a pressure regulator valve communicating with said pressure source for establishing a control pressure, said first valve means forming a part of a first fluid circuit portion interconnecting the hydraulic pilot operator for said curl motor means and said pressure source, and said second valve means defining in part a second fluid circuit portion interconnecting the hydraulic pilot operator for said lift motor means and said pressure source, a signal passage extending from said pressure regulator valve to each of said fluid circuit portions to supply the latter with said control pressure, a directional valve means in said signal passage having an operating means communicating with said manual operating means for said crowd motor for controlling distribution of said control pressure through said signal passage, a lift control valve in fluid communication with said directional valve means for interrupting and establishing a fluid connection between said control pressure regulator valve and the hydraulic operator for said lift motor, cam means having an operating part thereof connected to said boom portion for controlling the mode of operation of said lift control valve whereby the angle of the arc of movement of said boom portion is dependent upon the calibration of said cam, a signal pressure passage means in part defining a third circuit portion interconnecting said lift control valve and said hydraulic pilot operator for said swing motor whereby the swing motor is actuated in response to controlled movement of said lift control valve.

9. A hydraulically operated automatic backhoe unit comprising a main boom portion, a dipstick portion and a bucket portion arranged in articulated relationship with respect to each other, means for mounting one end of said boom portion on a vehicle chassis, a lift motor having hydraulically operated parts connected respectively to said chassis and to said boom portion, a crowd fluid motor having hydraulically operated parts connected respectively to said dipstick portion and to said boom portion, a bucket curl motor having hydraulically operated parts connected respectively to said dipstick portion and to said bucket portion, a swing motor having hydraulically operated parts connected respectively to said chassis and to said boom, a source of fluid pressure, conduit structure connecting said pressure source and said fluid motors, pressure distribution valve means situated in said conduit structure and partly defining the same for controlling distribution of pressure to each of said motors selectively, means for manually operating each of said valve means for selectively interrupting and establishing fluid communication between said pressure source and each of said motors, hydraulically operated pilot operators for the pressure distribution valves for said lift motor, said curl motor and said swing motor for actuating each of them, first valve means in said conduit structure responsive to a predetermined pressure build-up in said crowd motor for distributing a pressure signal to a pilot operator for said curl motor, second valve means in said conduit structure for distributing a pressure signal to said pilot operator for said lift motor in response to a predetermined pressure build-up in said crowd motor and in said curl motor, a pressure regulator valve communicating with said pressure source for establishing a control pressure, said first valve means forming a part of a first fluid circuit portion interconnecting the hydraulic pilot operator for said curl motor and said pressure source, and said second valve means defining in part a second fluid circuit portion interconnecting the hydraulic pilot operator for said lift motor and said pressure source, a signal passage extending from said pressure regulator valve to each of said fluid circuit portions to supply the latter with said control pressure, a directional valve means in said signal passage having an operating means communicating with the manual operating means for said crowd motor for controlling distribution of said control pressure through said signal passage, a lift control valve in fluid communication with said directional valve means for interrupting and establishing a fluid connection between said control pressure regulator valve and the hydraulic operator for said lift motor, cam means having an operating part thereof connected to said boom portion for controlling the mode of operation of said lift control valve whereby the angle of the arc of movement of said boom portion is dependent upon the calibration of said cam, and manually operable, multiple position, crowd motor control valve means in said conduit structure for crowding and retracting said crowd motor as it is actuated from one position to another.

10. A hydraulically operated automatic backhoe unit comprising a main boom portion, a dipstick portion and a bucket portion arranged in articulated relationship with respect to each other, means for mounting one end of said boom portion to a vehicle chassis, a lift motor having hydraulically operated parts connected respectively to said chassis and to said boom portion, a crowd fluid motor having hydraulically operated parts connected respectively to said dipstick portion and to said boom portion, a bucket curl motor having hydraulically operated parts connected respectively to said dipstick portion and to said bucket portion, a swing motor having hydraulically operated parts connected respectively to said chassis and to said boom portion, a source of fluid pressure, conduit structure connecting said pressure source and said fluid motors, pressure distribution valve means situated in said conduit structure and partly defining the same for controlling distribution of pressure to each of said motors selectively, means for manually operating each of said valve means for selectively interrupting and establishing fluid communication between said pressure source and each of said motors, hydraulically operated pilot operators for the pressure distribution valves for said lift motor, said curl motor and said swing motor for actuating each of them, first valve means in said conduit structure responsive to a predetermined pressure build-up in said crowd motor for distributing a pressure signal to a pilot operator for said curl motor, second valve means in said conduit structure for distributing a pressure signal to said pilot operator for said lift motor in response to a predetermined pressure build-up in said crowd motor and in said curl motor, a pressure regulator valve communicating with said pressure source for establishing a control pressure, said first valve means forming a part of a first fluid circuit portion interconnecting the hydraulic pilot operator for said curl motor and said pressure source, said second valve means defining in part a second fluid circuit portion interconnecting the hydraulic pilot operator for said lift motor means and said pressure source, a signal passage extending from said pressure regulator valve to each of said fluid circuit portions to supply the latter with said control pressure, a directional valve means in said signal passage the operating means of which communicates with the manual operating means for said crowd motor for controlling distribution of said control pressure through said signal passage, a lift control valve in fluid communication with said directional valve means for interrupting and establishing a fluid connection between said control pressure regulator valve and the hydraulic operator for said lift motor, cam means having an operating part thereof connected to said boom portion for controlling the mode of operation of said lift control valve whereby the angle of the arc of movement of said boom portion is dependent upon the calibration of said cam, a signal pressure passage means defining in part a third circuit portion interconnecting said lift control valve and said hydraulic pilot operator for said swing motor means whereby the swing motor means is actuated in response to controlled movement of said lift control valve, and manually operable, multiple position, crowd motor control valve means in said conduit structure for crowding and retracting said crowd motor as it is actuated from one position to another.

11. A hydraulically operated automatic backhoe unit comprising a main boom portion, a dipstick portion and a bucket portion arranged in articulated relationship with respect to each other, means for mounting one end of said boom portion to a vehicle chassis, a lift motor having hydraulically operated parts connected respectively to said chassis and to said boom portion, a crowd fluid motor having hydraulically operated parts connected respectively to said dipstick portion and to said boom portion, a bucket curl motor having hydraulically operated parts connected respectively to said dipstick portion and to said bucket portion, a swing motor having hydraulically operated parts connected respectively to said chassis and to said boom portion, a source of fluid pressure, conduit structure connecting said pressure source and said fluid motors, pressure distribution valve means situated in said conduit structure and partly defining the same for controlling distribution of pressure to each of said motors selectively, means for manually operating each of said valve means for selectively interrupting and establishing fluid communication between said pressure source and each of said motors, hydraulically operated pilot operators for the pressure distribution valves for said lift motor, said curl motor and said swing motor for actuating each of them, first valve means in said conduit structure responsive to a predetermined pressure build-up in said crowd motor for distributing a pressure signal to a pilot operator for said curl motor, second valve means in said conduit structure for distributing a pressure signal to said pilot operator for said lift motor in response to a predetermined pressure build-up in said crowd motor and in said curl motor, a pressure regulator valve communicating with said pressure source for establishing a control pressure, said first valve means forming a part of a first fluid circuit portion interconnecting the hydraulic pilot operator for said curl motor means and said pressure source, and said second valve means defining in part a second fluid circuit portion interconnecting the hydraulic pilot operator for said lift motor means and said pressure source, a signal passage extending from said pressure regulator valve to each of said fluid circuit portions to supply the latter with said control pressure, a directional valve means in said signal passage the operating means of which communicating with said manual operating means for said crowd motor for controlling distribution of said control pressure through said signal passage, a timing valve means for delaying the operation of one fluid motor following operation of another fluid motor which precedes it comprising a timing valve circuit having a pilot operated directional control valve connecting said pressure regulator valve and the pilot operator for the pressure distribution valve means for said other motor, an accumulator, said accumulator defining a pressure chamber of variable volume, a variable flow restricting orifice connecting said variable volume pressure chamber with said pressure regulator valve, a pasage interconnecting said accumulator, said variable flow restricting orifice, the pilot operator of said last-named directional control valve, and a pilot operated blocker valve, said blocker valve establishing a path between said pressure regulator valve and said directional control valve thereby bypassing the variable restricting orifice when said blocker valve is remotely operated by distribution of hydraulic pressure arising from the retraction side of said crowd motor to its pilot operator when said crowd motor reaches the end of its stroke, said pilot operated directional control valve establishing communication between said pressure regulator valve and said first circuit portion when it assumes one operating position and said second portion when it assumes another operating position.

12. A hydraulically operated automatic backhoe unit comprising a main boom portion, a dipstick portion and a bucket portion arranged in articulated relationship with respect to each other, means for mounting one end of said boom portion to a vehicle chassis, a lift motor having hydraulically operated parts connected respectively to said chassis and to said boom portion, a crowd fluid motor having hydraulically operated parts connected respectively to said dipstick portion and to said boom portion, a bucket curl motor having hydraulically operated parts connected respectively to said dipstick portion and to said bucket portion, a swing motor having hydraulically operated parts connected respectively to said chassis and to said boom portion, a source of fluid pressure, conduit structure connecting said pressure source and said fluid motors, pressure distribution valve means situated in said conduit structure and partly defining the same for controlling distribution of pressure to each of said motors selectively, means for manually operating each of said valve means for selectively interrupting and establishing fluid communication between said pressure source and each of said motors, hydraulically operated pilot operators for the pressure distribution valves for said lift motor, said curl motor and said swing motor for actuating each of them, first valve means in said conduit structure responsive to a predetermined pressure build-up in said crowd motor for distributing a pressure signal to a pilot operator for said curl motor, second valve means in said conduit structure for distributing a pressure signal to said pilot operator for said lift motor in response to a predetermined pressure build-up in said crowd motor and in said curl motor, a pressure regulator valve communicating with said pressure source for establishing a control pressure, said first valve means forming a part of a first fluid circuit portion interconnecting the hydraulic pilot operator for said curl motor means and said pressure source, and said second valve means defining in part a second fluid circuit portion interconnecting the hydraulic pilot operator for said lift motor means and said pressure source, a signal passage extending from said pressure regulator valve to each of said fluid circuit portions to supply the latter with said control pressure, a directional valve means in said signal passage the operating means of which communicates with said manual operating means for said crowd motor for controlling distribution of said control pressure through said signal passage, a lift control valve in fluid communication with said directional valve means for interrupting and establishing a fluid connection between said control pressure regulator valve and the hydraulic operator for said lift motor, cam means having an operating part thereof connected to said boom portion for controlling the mode of operation of said lift control valve whereby the angle of the arc of movement of said boom portion is dependent upon the calibration of said cam, a timing valve means for delaying the operation of one fluid motor following operating of another fluid motor which precedes it comprising a timing valve circuit having a pilot operated directional control valve connecting said pressure regulator valve and the pilot operator for the pressure distribution valve means for said other motor, an accumulator, said accumulator defining a pressure chamber of variable volume, a variable flow restricting orifice connecting said variable volume pressure chamber with said pressure regulator valve, a passage interconnecting said accumulator, said variable flow restricting orifice, the pilot operator of said last-named directional control valve, and a pilot operated blocker valve, said blocker valve establishing a path between said pressure regulator valve and said directional control valve thereby bypassing the variable restricting orifice when said blocker valve is remotely operated by distribution of hydraulic pressure arising from the retraction side of said crowd motor to its pilot operator when said crowd motor reaches the end of its stroke, said pilot operated directional control valve establishing communication between said pressure regulator valve and said first circuit portion when it assumes one operating position and said second portion when it assumes another operating position.

13. A hydraulically operated automatic backhoe unit comprising a main boom portion, a dipstick portion and a bucket portion arranged in articulated relationship with respect to each other, means for mounting one end of said boom portion on a vehicle chassis, a lift motor having hydraulically operated parts connected respectively to said chassis and to said boom portion, a crowd fluid motor having hydraulically operated parts connected respectively to said dipstick portion and to said boom portion, a bucket curl motor having hydraulically operated parts connected respectively to said dipstick portion and to said bucket portion, a swing motor having hydraulically operated parts connected respectively to said chassis and to said boom portion, a source of fluid pressure, conduit structure connecting said pressure source and said fluid motors, pressure distribution valve means situated in said conduit structure and partly defining the same for controlling distribution of pressure to each of said motors selectively, means for manually operating each of said valve means for selectively interrupting and establishing fluid communication between said pressure source and each of said motors, hydraulically operated pilot operators for the pressure distribution valves for said lift motor, said curl motor and said swing motor for actuating each of them, first valve means in said conduit structure responsive to a predetermined pressure build-up in said crowd motor for distributing a pressure signal to a pilot operator for said curl motor means, second valve means in said conduit structure for distributing a pressure signal to said pilot operator for said lift motor in response to a predetermined pressure build-up in said crowd motor and in said curl motor, a pressure regulator valve communicating with said pressure source for establishing a control pressure, said first valve means forming a part of a first fluid circuit portion interconnecting the hydraulic pilot operator for said curl motor and said pressure source, said second valve means defining in part a second fluid circuit portion interconnecting the hydraulic pilot operator for said lift motor and said pressure source, a signal passage extending from said pressure regulator valve to each of said fluid circuit portions to supply the latter with said control pressure, a directional valve means in said signal passage communicating with said manual operating means for said crowd motor for controlling distribution of said control pressure through said signal passage, a lift control valve in fluid communication with said directional valve means for interrupting and establishing a fluid connection between said control pressure regulator valve and the hydraulic operator for said lift motor, cam means having an operating part thereof connected to said boom portion for controlling the mode of operation of said lift control valve whereby the angle of the arc of movement of said boom portion is dependent upon the calibration of said cam, a signal pressure passage means defining in part a third circuit portion interconnecting said lift control valve and said hydraulic pilot operator for said swing motor whereby the swing motor means is actuated in response to controlled movement of said lift control valve, a timing valve means for delaying the operation of one fluid motor following operating of another fluid motor which precedes it comprising a timing valve circuit having a pilot operated directional control valve connecting said pressure regulator valve and the pilot operator for the pressure distribution valve means for said other motor, an accumulator, said accumulator defining a pressure chamber of variable volume, a variable flow restricting orifice connecting said variable volume pressure chamber with said pressure regulator valve, a passage interconnecting said accumulator, said variable flow restricting orifice, the pilot operator of said last-named directional control valve, and a pilot operated blocker valve, said blocker valve establishing a path between said pressure regulator valve and said directional control valve thereby bypassing the variable restricting orifice when said blocker valve is remotely operated by distribution of hydraulic pressure arising from the retraction side of said crowd motor to its pilot operator when said crowd motor reaches the end of its stroke, said pilot operated directional control valve establishing communication between said pressure regulator valve and said first circuit portion when it assumes one operating position and said second portion when it assumes another operating position.

14. A hydraulically operated automatic backhoe unit comprising a main boom portion, a dipstick portion and a bucket portion arranged in articulated relationship with respect to each other, means for mounting one end of said boom portion to a vehicle chassis, a lift motor having hydraulically operated parts connected respectively to said chassis and to said boom portion, a crowd fluid motor having hydraulically operated parts connected respectively to said dipstick portion and to said boom portion, a bucket curl motor having hydraulically operated parts connected respectively to said dipstick portion and to said bucket portion, a swing motor having hydraulically operated parts connected respectively to said chassis and to said boom portion, a source of fluid pressure, conduit structure connecting said pressure source and said fluid motors, pressure distribution valve means situated in said conduit structure and partly defining the same for controlling distribution of pressure to each of said motors selectively, means for manually operating each of said valve means for selectively interrupting and establishing fluid communication between said pressure source and each of said motors, hydraulically operated pilot operators for the pressure distribution valves for said lift motor, said curl motor and said swing motor for actuating each of them, first valve means in said conduit structure responsive to a predetermined pressure build-up in said crowd motor for distributing a pressure signal to a pilot operator for said curl motor, second valve means in said conduit structure for distributing a pressure signal to said pilot operator for said lift motor means in response to a predetermined pressure build-up in said crowd motor and in said curl motor, a pressure regulator valve communicating with said pressure source for establishing a control pressure, said first valve means forming a part of a first fluid circuit portion interconnecting the hydraulic pilot operator for said curl motor and said pressure source, and said second valve means defining in part a second fluid circuit portion interconnecting the hydraulic pilot operator for said lift motor and said pressure source, a signal passage extending from said pressure regulator valve to each of said fluid circuit portions to supply the latter with said control pressure, a directional valve means in said signal passage the operating means of which communicates with said manual operating means for said crowd motor for controlling distribution of said control pressure through said signal passage, a timing valve means for delaying the operation of one fluid motor following operating of another fluid motor which precedes it comprising a timing valve circuit having a pilot operated directional control valve connecting said pressure regulator valve and the pilot operator for the pressure distribution valve means for said other motor, an accumulator, said accumulator defining a pressure chamber of variable volume, a variable flow restricting orifice connecting said variable volume pressure chamber with said pressure regulator valve, a passage interconnecting said accumulator, said variable flow restricting orifice, the pilot operator of said last-named directional control valve, and a pilot operated blocker valve, said blocker valve establishing a path between said pressure regulator valve and said directional control valve thereby bypassing the variable restricting orifice when said blocker valve is remotely operated by distribution of hydraulic pressure arising from the retraction side of said crowd motor to its pilot operator when said crowd motor reaches the end of its stroke, said pilot operated directional control valve establishing communication between said pressure regulator valve and said first circuit portion when it assumes one operating position and said second portion when it assumes another operating position, means defining a third circuit portion interconnecting said swing motor means and said pressure regulator valve, said blocker valve establishing communication between said regulator valve and said first circuit portion when it assumes one operating position and establishing communication between said regulator valve and said third circuit portion when it assumes another operating position.

15. The combination as set forth in claim 3 wherein the pressure distributor valve means for at least one of said fluid motors comprises an operator including cooperating piston and cylinder members defining a pair of opposed pressure chambers on either side of said piston member, means for biasing said piston member with respect to said cylinder member to a central neutral position, a manual control lever connected mechanically to one of said operator members whereby said piston member and said cylinder member may be actuated manually in one direction or the other in unison, and means for mechanically connecting said one motor pressure distribution valve means to one of said operator members.

16. The combination as set forth in claim 5 wherein the pressure distributor valve means for at least one of said fluid motors comprises an operator including cooperating piston and cylinder members defining a pair of opposed pressure chambers on either side of said piston member, means for biasing said piston member with respect to said cylinder member to a central neutral position, a manual control lever connected mechanically to one of said operator members whereby said piston member and said cylinder member may be actuated manually in one direction or the other in unison, and means for mechanically connecting said one motor pressure distribution valve means to one of said operator members.

17. The combination as set forth in claim 6 wherein the pressure distributor valve means for at least one of said fluid motors comprises an operator including cooperating piston and cylinder members defining a pair of opposed pressure chambers on either side of said piston member, means for biasing said piston member with respect to said cylinder member to a central neutral position, a manual control lever connected mechanically to one of said operator members whereby said piston member and said cylinder member may be actuated manually in one direction or the other in unison, and means for mechanically connecting said one motor pressure distribution valve means to one of said operator members.

18. The combination as set forth in claim 3 wherein the pressure distributor valve means for at least one of said fluid motors comprises an operator including cooperating piston and cylinder members defining a pair of opposed pressure chambers on either side of said piston member, means for biasing said piston member with respect to said cylinder member to a central neutral position, a manual control lever connected mechanically to one of said operator members whereby said piston member and said cylinder member may be actuated manually in one direction or the other in unison, means for mechanically connecting said one motor pressure distribution valve means to one of said operator members, and means for biasing said manual control lever to a central neutral position, said one motor pressure distributor valve means being actuated in one direction or the other as pressure is selectively distributed to said opposed pressure chambers without a corresponding movement of said manual control lever.

19. The combination as set forth in claim 5 wherein the pressure distributor valve means for at least one of said motors comprises an operator including cooperating piston and cylinder members defining a pair of opposed pressure chambers on either side of said piston member, means for biasing said piston member with respect to said cylinder member to a central neutral position, a manual control lever connected mechanically to one of said operator members whereby said piston member and said cylinder member may be actuated manually in one direction or the other in unison, means for mechanically connecting said one motor pressure distribution valve means to one of said operator members, and means for biasing said manual control lever to a central neutral position, said one motor pressure distributor valve means being actuated in one direction or the other as pressure is selectively distributed to said opposed pressure chambers without a corresponding movement of said manual control lever.

20. The combination as set forth in claim 6 wherein the pressure distributor valve means for at least one of said fluid motors comprises an operator including cooperating piston and cylinder members defining a pair of opposed pressure chambers on either side of said piston member, means for biasing said piston member with respect to said cylinder member to a central neutral position, a manual control lever connected mechanically to one of said operator members whereby said piston member and said cylinder member may be actuated manually in one direction or the other in unison, means for mechanically connecting said one motor pressure distribution valve means to one of said operator members, and means for biasing said manual control lever to a central neutral position, said one motor pressure distributor valve means being actuated in one direction or the other as pressure is selectively distributed to said opposed pressure chambers without a corresponding movement of said manual control lever.

21. The combination as set forth in claim 7 wherein said third circuit is defined in part by a swing control valve means for selectively connecting said pressure regulator valve to said third circuit and said first circuit as it assumes respectively one operating position or the other, said swing valve means including a movable swing control directional valve capable of establishing either one position or the other, and a cam operator for said swing control directional valve comprising a movable cam element connected to said boom portion whereby the hydraulic response of the distribution valve means for said swing motor is established at a predetermined degree of arc of travel of said boom portion during an operating sequence.

22. The combination as set forth in claim 10 wherein said third circuit portion is defined in part by a swing control valve means for selectively connecting said pressure regulator valve to said third circuit portion and said first circuit as it assumes respectively one operating position or the other, said swing valve means including a movable swing control directional valve capable of establishing either one position or the other, and a cam operator for said swing control directional valve comprising a movable cam element connected to said boom portion whereby the hydraulic response of the distribution valve means for said swing motor is established at a predetermined degree of arc of travel of said boom portion during an operating sequence.

23. The combination as set forth in claim 13 wherein said third circuit portion is defined in part by a swing control valve means for selectively connecting said pressure regulator valve to said third circuit and said first circuit as it assumes respectively one operating position or the other, said swing valve means including a movable swing control directional valve capable of establishing either one position or the other, and a cam operator for said swing control directional valve comprising a movable cam element connected to said boom portion whereby the hydraulic response of the distribution valve means for said swing motor is established at a predetermined degree of arc of travel of said boom portion during an operating sequence.

24. A hydraulically operated automatic digger comprising a main portion, an arm portion and a load carrying portion arranged in articulated relationship with respect to each other, means for pivotly mounting one end of said main portion on a vehicle chassis, a lift motor having hydraulically operated parts connected respectively to said chassis and to said main portion, a crowd motor having hydraulically operated parts connected respectively to said arm portion and to said main portion, a curl motor having hydraulically operated parts connected respectively to said arm portion and to said load carrying portion, a swing motor having hydraulically operated parts connected respectively to said chassis and to said main portion, said main portion being pivoted for angular adjustment with respect to a generally horizontal axis and for independent adjustment with respect to a generally vertical swing axis, said crowd motor having a double acting piston, a working cylinder receiving said piston and defining therewith a pair of opposed working chambers, said arm portion extending outwardly with respect to said main portion as one pressure chamber is pressurized and crowding toward said main portion as the other pressure chamber is pressurized, said curl motor comprising a double-acting piston connected to said load carrying portion and a cylinder surrounding said piston, said curl motor piston and cylinder cooperating to define a pair of opposed working chambers, said load carrying portion moving with respect to said arm portion to a dumping position when one curl motor pressure chamber is pressurized and moving with a digging motion when the other curl motor pressure chamber is pressurized, a source of fluid pressure, conduit structure connecting said pressure source and said motors, pressure distributor valve means situated in said conduit structure and partly defining the same for controlling distribution of pressure to each of said motors selectively, hydraulically operated pilot operators for the pressure distributor valve means for said motors for actuating each of them, a pressure signal source, a first valve means in said conduit structure communicating with said signal source for distributing a pressure signal to the pilot operator for said curl motor thereby causing said load carrying portion to assume a fully curled position, sub-circuit means for connecting said signal source to the pilot operator for said lift motor pressure distributor valve means as the pressure in said other pressure chamber of said crowd motor increases and cam operated valve means defining a part of said sub-circuit for interrupting pressure distribution to the pilot operator for the lift motor pressure distributor valve means after a pre-determined degree of movement of said main portion about its horizontal axis and for directing the pressure signal in said sub-circuit to the pilot operator for the swing motor pressure distributor valve means thereby effecting swinging motion of said main portion about its vertical axis.

25. A hydraulically operated automatic digger comprising a main portion, an arm portion and a load carrying portion arranged in articulated relationship with respect to each other, means for pivotly mounting one end of said main portion on a vehicle chassis, a lift motor having hydraulically operated parts connected respectively to said chassis and to said main portion, a crowd motor having hydraulically operated parts connected respectively to said arm portion and to said main portion, a curl motor having hydraulically operated parts connected respectively to said arm portion and to said load carrying portion, a swing motor having hydraulically operated parts connected respectively to said chassis and to said main portion, said main portion being pivoted for angular adjustment with respect to a generally horizontal axis and for independent adjustment with respect to a generally vertical swing axis, said crowd motor having a double acting piston, a working cylinder receiving said piston and defining therewith a pair of opposed working chambers, said arm portion extending outwardly with respect to said main portion as one pressure chamber is pressurized and crowding toward said main portion as the other pressure chamber is pressurized, said curl motor comprising a double-acting piston connected to said load carrying portion and a cylinder surrounding said piston, said curl motor piston and cylinder cooperating to define a pair of opposed working chambers, said load carrying portion moving with respect to said arm portion to a dumping position when one curl motor pressure chamber is pressurized and moving with a digging motion when the other curl motor pressure chamber is pressurized, a source of fluid pressure, conduit structure connecting said pressure source and said motors, pressure distributor valve means situated in said conduit structure and partly defining the same for controlling distribution of pressure to each of said motors selectively, hydraulically operated pilot operators for the pressure distributor valve means for said motors for actuating each of them, a pressure signal source, a first valve means in said conduit structure communicating with said signal source for distributing a pressure signal to the pilot operator for said curl motor thereby causing said load carrying portion to assume a fully curled position, sub-circuit means for connecting said signal source to the pilot operator for said lift motor pressure distributor valve means as the pressure in said other pressure chamber of said crowd motor increases and cam operated valve means defining a part of said sub-circuit for interrupting pressure distribution to the pilot operator for the lift motor pressure distributor valve means after a pre-determined degree of movement of said main portion about its horizontal axis and for directing the pressure signal in said sub-circuit to the pilot operator for the swing motor pressure distributor valve means thereby effecting swinging motion of said main portion about its vertical axis, and cam operated valve means responding to movement of said main portion about its vertical axis for distributing the pressure signal from said signal source to the pilot operator for the curl motor pressure distributor valve means thereby effecting movement of said load carrying portion to a dump position following a pre-determined accurate movement of said main portion about its vertical axis.

26. The combination as set forth in claim 24 wherein said sub-circuit comprises a first passage connected to said signal source and to output passages, shuttle valve means including a moveable valve element for connecting alternately said first passage with said output passages as it is shifted from one position to another, a first of said output passage being connected to the pilot operator for the curl motor pressure distributor valve means for actuating the same to the curl motor digging position, the other output passage communicating with the pilot operator for said lift motor pressure distributor valve means, and a time delay valve system establishing a connection between said shuttle valve means and the aforesaid first passage for shifting the shuttle valve in a direction to pressurize the other output passage after a pre-determined time delay following the initial development of a pressure in said other pressure chamber of said crowd motor.

27. A hydraulically operated automatic digger comprising a main portion, an arm portion and a load carrying portion arranged in articulated relationship with respect to each other, means for pivotly mounting one end of said main portion on a vehicle chassis, a lift motor having hydraulically operated parts connected respectively to said chassis and to said main portion, a crowd motor having hydraulically operated parts connected respectively to said arm portion and to said main portion, a curl motor having hydraulically operated parts connected respectively to said arm portion and to said load carrying portion, a swing motor having hydraulically operated parts connected respectively to said chassis and to said main portion, said main portion being pivoted for angular adjustment with respect to a generally horizontal axis and for independent adjustment with respect to a generally vertical swing axis, said crowd motor having a double acting piston, a working cylinder receiving said piston and defining therewith a pair of opposed working chambers, said arm portion extending outwardly with respect to said main portion as one pressure chamber is pressurized and crowding toward said main portion as the other pressure chamber is pressurized, said curl motor comprising a double-acting piston connected to said load carrying portion and a cylinder surrounding said piston, said curl motor piston and cylinder cooperating to define a pair of opposed working chambers, said load carrying portion moving with respect to said arm portion to a dumping position when one curl motor pressure chamber is pressurized and moving with a digging motion when the other curl motor pressure chamber is pressurized, a source of fluid pressure, conduit structure connecting said pressure source and said motors, pressure distributor valve means situated in said conduit structure and partly defining the same for controlling distribution of pressure to each of said motors selectively, hydraulically operated pilot operators for the pressure distributor valve means for said motors for actuating each of them, a pressure signal source, a first valve means in said conduit structure communicating with said signal source for distributing a pressure signal to the pilot operator for said curl motor thereby causing said load carrying portion to assume a fully curled position, sub-circuit means for connecting said signal source to the pilot operator for said lift motor pressure distributor valve means as the pressure in said other pressure chamber of said crowd motor increases and cam operated valve means defining a part of said sub-circuit for interrupting pressure distribution to the pilot operator for the lift motor pressure distributor valve means after a pre-determined degree of movement of said main portion about its horizontal axis and for directing the pressure signal in said sub-circuit to the pilot operator for the swing motor pressure distributor valve means thereby effecting swinging motion of said main portion about its vertical axis, and a cam-operated swing arc control valve means forming in part a branch signal passage extending from said signal source to the curl motor pressure distributor valve operator including a cam member connected to said main portion which triggers the operation of said swing control valve means as said main portion achieves a predetermined angular position with respect to its vertical axis whereby said curl motor is adjusted to its dumping position.

28. A hydraulically operated automatic digger comprising a main portion, an arm portion and a load carrying portion arranged in articulated relationship with respect to each other, means for pivotly mounting one end of said main portion on a vehicle chassis, a lift motor having hydraulically operated parts connected respectively to said chassis and to said main portion, a crowd motor having hydraulically operated parts connected respectively to said arm portion and to said main portion, a curl motor having hydraulically operated parts connected respectively to said arm portion and to said load carrying portion, a swing motor having hydraulically operated parts connected respectively to said chassis and to said main portion, said main portion being pivoted for angular adjustment with respect to a generally horizontal axis and for independent adjustment with respect to a generally vertical swing axis, said crowd motor having a double acting piston, a working cylinder receiving said piston and defining therewith a pair of opposed working chambers, said arm portion extending outwardly with respect to said main portion as one pressure chamber is pressurized and crowding toward said main portion as the other pressure chamber is pressurized, said curl motor comprising a double-acting piston connected to said load carrying portion and a cylinder surrounding said piston, said curl motor piston and cylinder cooperating to define a pair of opposed working chambers, said load carrying portion moving with respect to said arm portion to a dumping position when one curl motor pressure chamber is pressurized and moving with a digging motion when the other curl motor pressure chamber is pressurized, a source of fluid pressure, conduit structure connecting said pressure source and said motors, pressure distributor valve means situated in said conduit structure and partly defining the same for controlling distribution of pressure to each of said motors selectively, hydraulically operated pilot operators for the pressure distributor valve means for said motors for actuating each of them, a pressure signal source, a first valve means in said conduit structure communicating with said signal source for distributing a pressure signal to the pilot operator for said curl motor thereby causing said load carrying portion to assume a fully curled position, sub-circuit means for connecting said signal source to the pilot operator for said lift motor pressure distributor valve means as the pressure in said other pressure chamber of said crowd motor increases and cam operated valve means defining a part of said sub-circuit for interrupting pressure distribution to the pilot operator for the lift motor pressure distributor valve means after a pre-determined degree of movement of said main portion about its horizontal axis and for directing the pressure signal in said sub-circuit to the pilot operator for the swing motor pressure distributor valve means thereby effecting swinging motion of said main portion about its vertical axis, and cam operated valve means responding to movement of said main portion about its vertical axis for distributing the pressure signal from said signal source to the pilot operator for the curl motor pressure distributor valve means thereby affecting movement of said load carrying portion to a dump position following a pre-determined accurate movement of said main portion about its vertical axis, and a cam-operated swing arc control valve means forming in part a branch signal passage extending from said signal source to the curl motor pressure distributor valve operator including a cam member connected to said main portion which triggers the operation of said swing control valve means as said main portion achieves a pre-determined angular position with respect to its vertical axis whereby said curl motor is adjusted to its dumping position.

References Cited

UNITED STATES PATENTS

| | | | |
|---|---|---|---|
| 2,243,626 | 5/1941 | Gregg et al. | 91—453 X |
| 2,950,703 | 8/1960 | Fletcher et al. | 91—453 X |
| 3,339,763 | 9/1967 | Caywood et al. | 214—138 |

HUGO O. SCHULZ, *Primary Examiner.*